(12) United States Patent
Evans

(10) Patent No.: US 8,830,223 B2
(45) Date of Patent: Sep. 9, 2014

(54) COMPUTER AIDED DESIGN OF THREE-DIMENSIONAL CARTONS WITH CURVED CREASES

(75) Inventor: Llewelyn John Evans, Wilbraham, MA (US)

(73) Assignee: Esko Software BVBA, Ghent (BE)

(*) Notice: Subject to any disclaimer, the term of this patent is extended or adjusted under 35 U.S.C. 154(b) by 1046 days.

(21) Appl. No.: 12/433,820

(22) Filed: Apr. 30, 2009

(65) Prior Publication Data

US 2009/0278843 A1 Nov. 12, 2009

Related U.S. Application Data

(60) Provisional application No. 61/051,615, filed on May 8, 2008.

(51) Int. Cl.
| | |
|---|---|
| G06T 15/00 | (2011.01) |
| G06T 15/40 | (2011.01) |
| G06F 19/00 | (2011.01) |
| G06K 15/00 | (2006.01) |

(52) U.S. Cl.
USPC ............ 345/419; 345/421; 700/97; 700/98; 700/182; 358/1.18

(58) Field of Classification Search
None
See application file for complete search history.

(56) References Cited

U.S. PATENT DOCUMENTS

| 7,346,408 B2 | 3/2008 | Van Bael et al. ............ 700/98 |
| 2005/0157342 A1 | 7/2005 | Bru ............................. 358/1.18 |
| 2006/0207212 A1* | 9/2006 | Durney ....................... 52/731.7 |
| 2007/0023987 A1 | 2/2007 | Kling ............................ 270/32 |

FOREIGN PATENT DOCUMENTS

GB 1217067 A 12/1970

OTHER PUBLICATIONS

Saadya Sternberg, Curves and Flats, Proceedings of the 4th Conference on Origami in Math, Science and Education, Stanford University, 2006 Draft, The Fourth International Conference on Origami in Science, Mathematics, and Education (4OSME), Sep. 8-10, 2006, at the CalTech, Pasadena, California, USA, http://Saadya.net/4OSME/CURVESandFLATS.pdf.*

Miyazaki et al, An Origami Playing Simulator in the Virtual Space, The Journal of Visualization and Computer Animation, vol. 7(1), pp. 25-42, 1996, http://www.om.sist.chukyo-u.ac.jp/main/research/origami/journal/jvca.html.*

M. Kilian, S. Flöry, Z. Chen, N.J. Mitra, A. Sheffer and H.Pottmann. "Curved Folding." *ACM Transactions on Graphics*, 2008, vol. 27, No. 3, pp. 1-9.

Farina J et al: "Automatic Segmentation of Rotary Dies for the Production of Corrugated Cardboard Boxes" Industrial Electronics, 2005. ISIE 2005. Proceedings of the IEEE Inter National Symposium on Dubrovnik, Croatia Jun. 20-23, 2005, Piscataway, NJ, USA,IEEE, vol. 4, Jun. 20, 2005, pp. 1359-1364, XP 010850291 ISBN: 978-0-7803-8738-6.

* cited by examiner

*Primary Examiner* — Tize Ma
(74) *Attorney, Agent, or Firm* — Dov Rosenfeld; Inventek

(57) ABSTRACT

A method, a computer readable medium with instructions to execute a method, and a carton designed using a method. The method includes accepting a specification of a carton made up of a substrate and having at least one curved crease. The method further includes for a curved crease, accepting a folding angle at any point of the crease; and automatically calculating at least one shape of the folded carton in order to determine a three-dimensional model of the folded carton.

26 Claims, 27 Drawing Sheets

Crease divided
into segments in 2D

Shape of the crease in
3D when folded

Panel in 2D

Aligning the curved creases in 3D on opposite sides of the panel

```
LoopA: For each crease:
begin
        if the crease is curved
                if (the preceding crease is curved)
                        set join1 to point to the preceding crease
                else
                        set join1 = null
                endif
                if (the following crease is curved)
                        set join2 to point to the following crease
                else
                        set join2 = null
                endif
        else
                set join1,join2 = null
        endif
end
```

FIG. 18A

```
LoopB: For each crease
Begin
        calculate unit normal vector to the crease to the left
        if (join1= null) and (crease is curved)
                set join1 to point to the opposite crease in the direction
                of the normal, from the mid-point of the first half of the
                crease
        endif
        if (join2= null) and (crease is curved)
                set join2 to point to the opposite crease in the direction
                of the normal, from the mid-point of the second half of the
                crease
        endif
end
```

FIG. 18B

COMPUTER AIDED DESIGN OF THREE-DIMENSIONAL CARTONS WITH CURVED CREASES

RELATED APPLICATION

The present invention claims benefit of and is a conversion of U.S. Provisional Patent Application No. 61/051,615 filed May 8, 2008 to inventor Evans. The contents of such U.S. Application 61/051,615 are incorporated herein by reference.

FIELD OF THE INVENTION

The present invention is related to packaging design, and in particular, to a method and apparatus for generating and rendering a realistic looking three-dimensional model of an item of packaging that includes one or more curved creases.

BACKGROUND

Packaging professionals who design folding cartons, corrugated boxes and corrugated displays use packaging computer aided design (CAD) software to fold a virtual model of a carton design on a computer. Esko-Artwork of Gent Belgium, for example, markets two such packaging CAD software products: one called ArtiosCAD and the other called Score! Esko-Graphics of Gent Belgium makes CAD software called PackEdge also for design on packaging.

Such software allows for a package to be designed, including cut lines, crease lines (referred to as folds, fold lines, creases, and/or crease lines herein). Two views may be presented, an unfolded two-dimensional (2D) view, and a perspective three-dimensional (3D) view of the carton folded up, i.e., a rendering of a 3D model of the folded carton.

FIG. 1 shows a typical package design with straight creases, which can be folded in current CAD software. FIG. 2 shows a package design with straight creases folded up, e.g., using a program such as ArtiosCAD.

Some designs use curved creases that cannot be modeled correctly with current CAD software that is applicable to straight creases. To work around this problem, designers today might do one of the following:

Make a physical model.
Replace the curved creases with straight creases to make a crude approximation.

BRIEF DESCRIPTION OF THE DRAWINGS

FIG. 8A shows a board bending along horizontal bend lines, FIG. 8B shows a board bending along vertical bend lines, FIG. 9A shows horizontal bend lines, and FIG. 9B shows vertical bend lines.

FIGS. 18A and 18B show pseudocode for initializing some variables in a method embodiment of the invention.

DESCRIPTION OF EXAMPLE EMBODIMENTS

Overview

Figure 1:
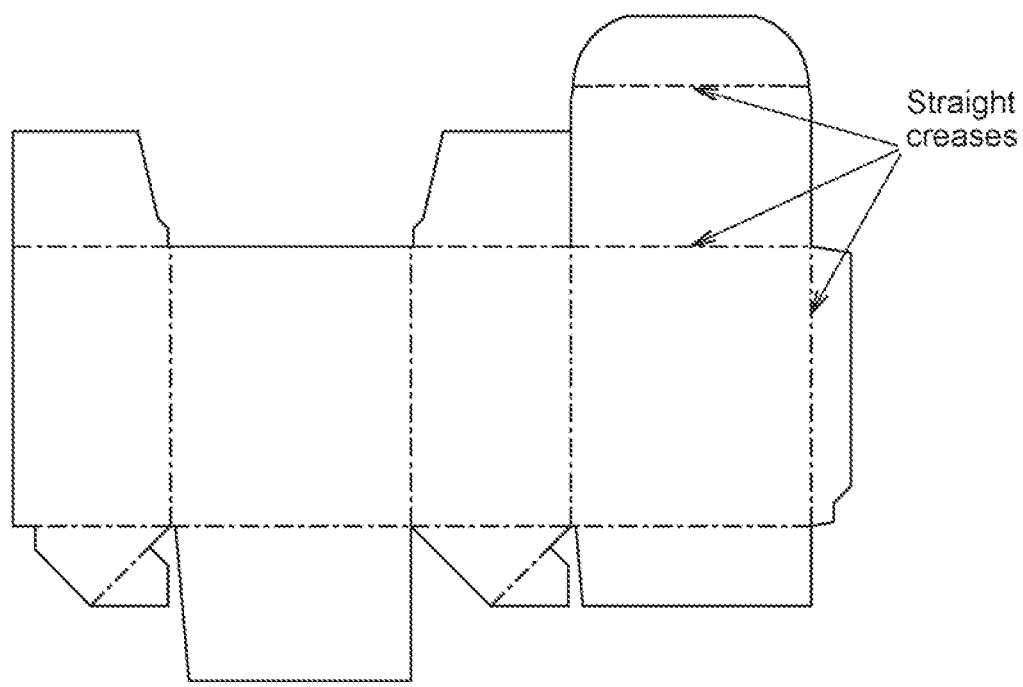
FIG. 1 shows an example of a package design with straight creases.

Embodiments of the present invention include a method, and apparatus, and logic encoded in one or more computer-readable tangible medium to carry out a method. Embodiments further include a computer readable medium having instructions coded thereon that when executed cause carrying out of a method. The method includes modeling packaging designs with curved creases realistically on a computer, including rendering a folded carton in 3D. Such a method may offer the following benefits to a packaging designer:

Packaging designs with curved creases can be designed and evaluated quickly on a computer without having to make physical models.

Curved crease designs can be communicated quickly and electronically to customers and partners for collaboration in the design process Animations and setup instructions for curved crease designs can be created and communicated quickly and electronically.

Particular embodiments include a method of operating a processing system that includes at least one processor and a storage subsystem, the method comprising accepting a specification of a carton made up of a substrate and having at least one curved crease, and storing at least part of the accepted specification in the storage subsystem. The method further comprises for a curved crease, accepting a folding angle at any point of the crease; and automatically calculating using at least one processor of the processing system at least one shape of the folded carton in order to determine a three-dimensional model of the folded carton. The calculating includes reading at least some of the stored part of the specification.

Particular embodiments include a method of operating a processing system that includes at least one processor, a display device and a storage subsystem, the method comprising accepting a specification of a carton made up of a substrate and having at least one curved crease and storing at least part of the specification in the storage subsystem. The specification includes at least cut lines and crease lines. The method further includes accepting specification of or determining panels of the carton, and determining how any curved creases in each panel are connected. The method further includes automatically calculating in at least one processor of the processing system the shape of the curved creases when folded, aligning the curved creases on opposite sides of each domain to obtain a three-dimensional model of the folded carton. The calculating includes reading at least some of the stored part of the specification. The method includes rendering the carton in a selected view and displaying the rendered selected view on the display device.

Particular embodiments include a computer readable medium having instructions encoded thereon that when executed by one or more processors of a processing system cause execution of a method comprising accepting a specification of a carton made up of a substrate and having at least one curved crease, and storing at least part of the accepted specification in the storage subsystem. The method further comprises for a curved crease, accepting a folding angle at any point of the crease; and automatically calculating on at least one of the processors at least one shape of the folded carton in order to determine a three-dimensional model of the folded carton. The calculating includes reading at least some of the stored part of the specification.

Particular embodiments include a computer readable medium having instructions encoded thereon that when executed by one or more processors of a processing system that also includes a display device and a storage subsystem cause execution of a method comprising accepting a specification of a carton made up of a substrate and having at least one curved crease and storing at least part of the accepted specification in the storage subsystem. The specification includes at least cut lines and crease lines. The method further includes accepting specification of or determining panels of the carton, determining how any curved creases in each panel are connected, automatically calculating on at least one processor the shape of the curved creases when folded, aligning the curved creases on opposite sides of each domain to obtain a three-dimensional model of the folded carton; and rendering the carton in a selected view. The method includes rendering the carton in a selected view and displaying the rendered selected view on the display device.

Particular embodiments include a carton designed using a method comprising accepting a specification of a carton made up of a substrate and having at least one curved crease. The method further comprises for a curved crease, accepting a folding angle at any point of the crease; and automatically calculating at least one shape of the folded carton in order to determine a three-dimensional model of the folded carton.

Particular embodiments include a carton designed using a method comprising accepting a specification of a carton made up of a substrate and having at least one curved crease, the specification including at least cut lines and crease lines. The method further includes accepting specification of or determining panels of the carton, determining how any curved creases in each panel are connected, automatically calculating the shape of the curved creases when folded, aligning the curved creases on opposite sides of each domain to obtain a three-dimensional model of the folded carton; and rendering the carton in a selected view.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

Nomenclature and the Design of Packaging Using an Embodiment of the Invention.

The present invention relates generally to computerized design of three-dimensional containers, cartons, boxes, and the like. The methods described facilitate, for example, the folding and unfolding of a two dimensional representation or other specification of a board that includes cut lines and fold lines, from which two-dimensional flaps and panels are later to be cut. This includes generating a three-dimensional model of the object after cutting and folding. Once designed, a user can properly align and size graphics printed on the substrate. The graphics can then be correctly located on the two-dimensional substrate flaps and panels on the two-dimensional model, so that the substrate can be cut and folded to form a three-dimensional container bearing the graphics. This aspect is called "unfolding" of the three-dimensional design.

Embodiments of the present invention include a method of operating a processing system that includes a storage subsystem, an apparatus, and a computer readable storage medium having encoded thereon instructions that when executed cause carrying out a method. The method includes modeling packaging designs with curved creases realistically on a computer, including rendering a folded carton in 3D. The method includes calculating the shape of the erected folded package design after it has been glued. The storage subsystem includes at least memory and possible one or more other storage elements, e.g., a hand disk and/or an optical disk. The processing system further includes a display device.

Containers, cartons, boxes, and the like (collectively referred to herein as cartons) are commonly formed into 3D-shapes from a planar substrate such as corrugated cardboard, although other material may be used. The substrate—also called the board—is often printed with graphics, scored, and then folded at scored edges through a typically but not necessarily 90° fold angle to form the three-dimensional shape of the carton. The various surfaces of the carton, e.g., top, bottom, sides in the case of a rectangular box, are often referred to as panels, and a panel may be formed from, or include, several flaps. A side of a carton that is made up of a single panel without flaps is often termed a carton surface.

The cartons described herein include one or more curved creases, also called folds.

Thus, in this description, a panel is a flat or curves surface of the final 3D-shape of the carton. Some panels are visible, and some, called flaps, are a part of the unfolded design but do not form a surface of the final 3D shape of the carton. Each visible panel has one flap, and some may have more.

The following nomenclature is used in the present description. A carton is formed from a sheet or roll of substrate material that is scored, cut, (or cut and then scored), and folded generally at scored fold edges, called creases and also called folds interchangeably herein. The folding is through a fold angle to define various carton panels. When the folds are curved, the panels may be non-planar. In a carton with straight edges, the fold angle is typically 90°, where 0° is defined as being in the plane of the unfolded material. It is understood that panels may, but need not be, formed from flaps.

The outer panel surfaces of cartons frequently will have been printed with graphic designs that can advertise the product within and convey other useful information. The printed design may be graphics per se, text, or other indicia (collectively referred to herein as graphics).

Having a three-dimensional model has various advantages. One is to place graphics thereon, see how that graphics appear on the three-dimensional model, and then create the required two-dimensional designs for printing (and cutting). In the past, a graphics artist typically will have designed the graphics for container on a panel-by-panel basis. Such design is undertaken without the graphics artist having knowledge of how the carton is folded, or even how some of the panels may be formed from individual flaps, or portions of flaps. Thus the graphics for an upper panel may be rendered as a first electronic file, created on a computer using a software drawing program, the graphics for a front and a rear panel may be rendered as second and third electronic files. Another, e.g., right hand panel may be rendered as yet another electronic file. In some instances the flaps that comprise a panel may themselves be created as separate electronic files. The graphics depicted a panel may be generated from several separate electronic files, one file for each flap in the panel. While the various panel files may be combined into a single file, the point to be made is that in prior art systems, the graphics are generally created on a per-panel or per-flap basis, almost as though separate graphic design projects were being undertaken.

The rendered graphics may be displayed on a display device of a processing system.

Again in the past, in creating the various electronic files, the graphics artist generally have been concerned only with the dimensions of the various substrate areas of interest, e.g., the overall size of the individual panels and flaps to be printed. How the substrate will be folded to form a carton was generally the responsibility of a structural designer and too often was of little concern to the graphics artist. Indeed, the graphics artist typically was more concerned with how the printed graphics will look on individual panels or on the finished product—a three-dimensional carton, than how the graphics need to be laid out on the different flaps. Therefore, for example, for 3D cartons with rectangular sides, programs were known that could show a user how a design would look in 3D, that is, that would take a 2D design of flaps and panels, and generate a 3D rendering of the folded carton. We call this folding. Unfolding, that is, starting with a 3D model and a display of the 3D carton, placing graphics thereon while viewing the 3D model, and then unfolding the 3D model with the graphics thereon, has only recently been automated, and only for cartons with traditional planar panels.

Using a computerized method in the form described herein to aid in the structural design of the carton by embedding folding information in the structural design, and to allow the designer to take a flat or planar layout and, using folding information, view the design on a display device, e.g., a computer monitor in a rendered three-dimensional form. The designer can then apply graphics to the design, and then unfold to create printable 2D panels. Such tools have in the past not been accurate for the case of curved folds (curved creases).

Without using 3D visualization tools such as provided by the present invention, it can be very challenging to design and print graphics on a substrate to ensure that after the carton is cut from the substrate and folded, the various graphic images will have been printed with proper orientation, sizing, and good registration, e.g., such that there is image continuity for an image that may extend over more than one flap or panel. Understandably proper orientation, sizing, and registration can be problematic where images on several folded flaps combine to create a larger panel image. Designing and creating such graphics is both labor intensive and very prone to error, including error from print bleeding.

For the case of boxes with only straight edges, Commonly-assigned U.S. Patent Publication US 20050157342 to inventor Bru, U.S. Pat. No. 7,346,408 to inventors Van Bael et al. describes methods to aid in the design of a carton. The contents of each of US 20050157342 and U.S. Pat. No. 7,346,408 are incorporated herein by reference. The method of US 20050157342, e.g., in the form of a program, provides for construction of a three-dimensional model of the carton showing the graphics to be printed. The program is provided with carton structural input information including dimensions of the various panels and flaps, fold or score lines, and fold angles. The method described herein provides a three-dimensional model of the folded design (the case of a design with straight edges is assumed in US 20050157342). The method of US 20050157342 includes accepting graphics to be printed on a panel of a finished carton, e.g., a panel that has several flaps, and provides for automatically positioning and manipulating the graphics using available carton structural information. A graphics program implementing the method generates a single computer file containing graphics for each panel and flap of the carton to be created from the substrate material. The graphics program creates both planar and three-dimensional images of the carton for display and manipulation on a computer monitor. The displayed images can be of the carton with graphics. While viewing such a display, a graphics designer can rotate, scale, and otherwise manipulate the displayed graphics, as needed, to accommodate each panel and flap, and can define clipping masks as needed. This ability to view and manipulate a three-dimensional computer-generated image of a virtual carton whose panels and flaps contain the graphics allows the designer to confirm proper alignment, orientation, and scaling of graphics on the finished carton. The 3D design can be unfolded. The computer-generated file is output and made available as input to a carton production system to control printing of graphics on the flat substrate before the substrate is cut and folded to yield the three-dimensional carton bearing the printed graphics.

U.S. Pat. No. 7,346,408 describes a method that helps facilitate for a designer the proper alignment and sizing of graphics printed on a substrate from which two-dimensional flaps and panels are cut and folded to form a three-dimensional container bearing the graphics. The method of U.S. Pat. No. 7,346,408 includes rendering a 3D model of a folded carton that includes curved creases. The folded carton of U.S. Pat. No. 7,346,408 typically had straight creases. For such cartons, the method of U.S. Pat. No. 7,346,408 provided the ability to use the 3D model to interactively navigate in the 2D unfolded view of the carton, and to place alignment guides into the 3D model and see the results as guides in the 2D unfolded view of the carton. The method of the present invention includes folding a 2D unfolded view to provide the 3D model and a perspective rendering for the case of curved creases.

Figure 19:
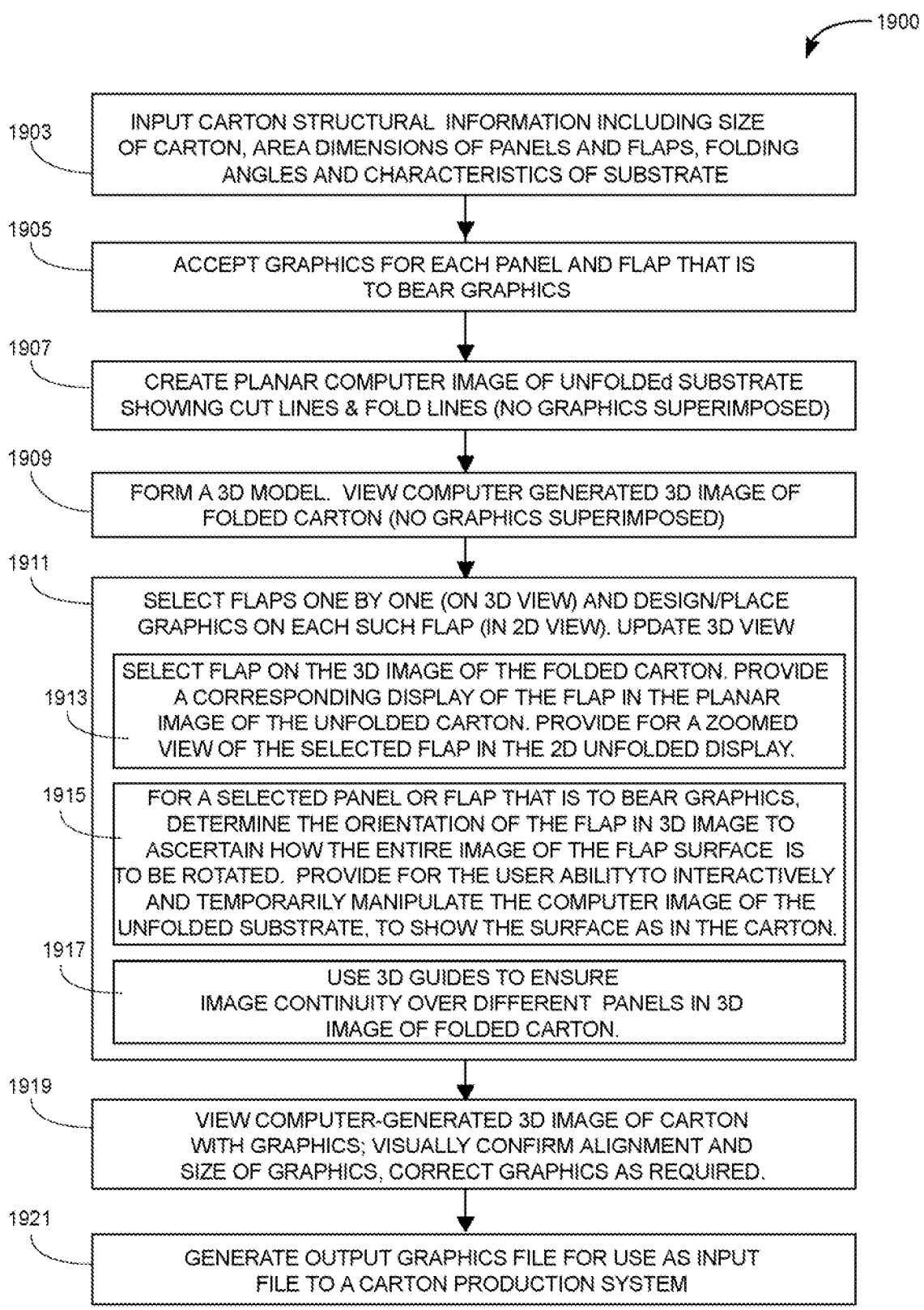
FIG. 19 shows a flowchart of a method embodiment 1900 of the invention.

Once the method of the present invention is used to obtain the 3D model, manipulating graphics is one application possibility. FIG. 19 shows a flowchart of a method embodiment 1900 that when used, provides for two-dimensional graphics to be accurately created for printing on a substrate from which panels and flaps can be cut and folded to form a three-dimensional carton with graphics printed thereon, the carton including one or more curved creases. The method of the present invention is used to create the 3D model and to generate perspective views of the folded carton, and also to move back and forth between the folded 3D view and unfolded 2D view of the carton. The method of the flowchart of FIG. 19 provides for a user the ability to achieve good alignment and registration of the overall graphics on the completed three-dimensional carton, with reduced labor and reduced likelihood of human error compared to prior art methods. The method provides an accurate rendering on a display of what the folded carton looks like.

Figure 20:
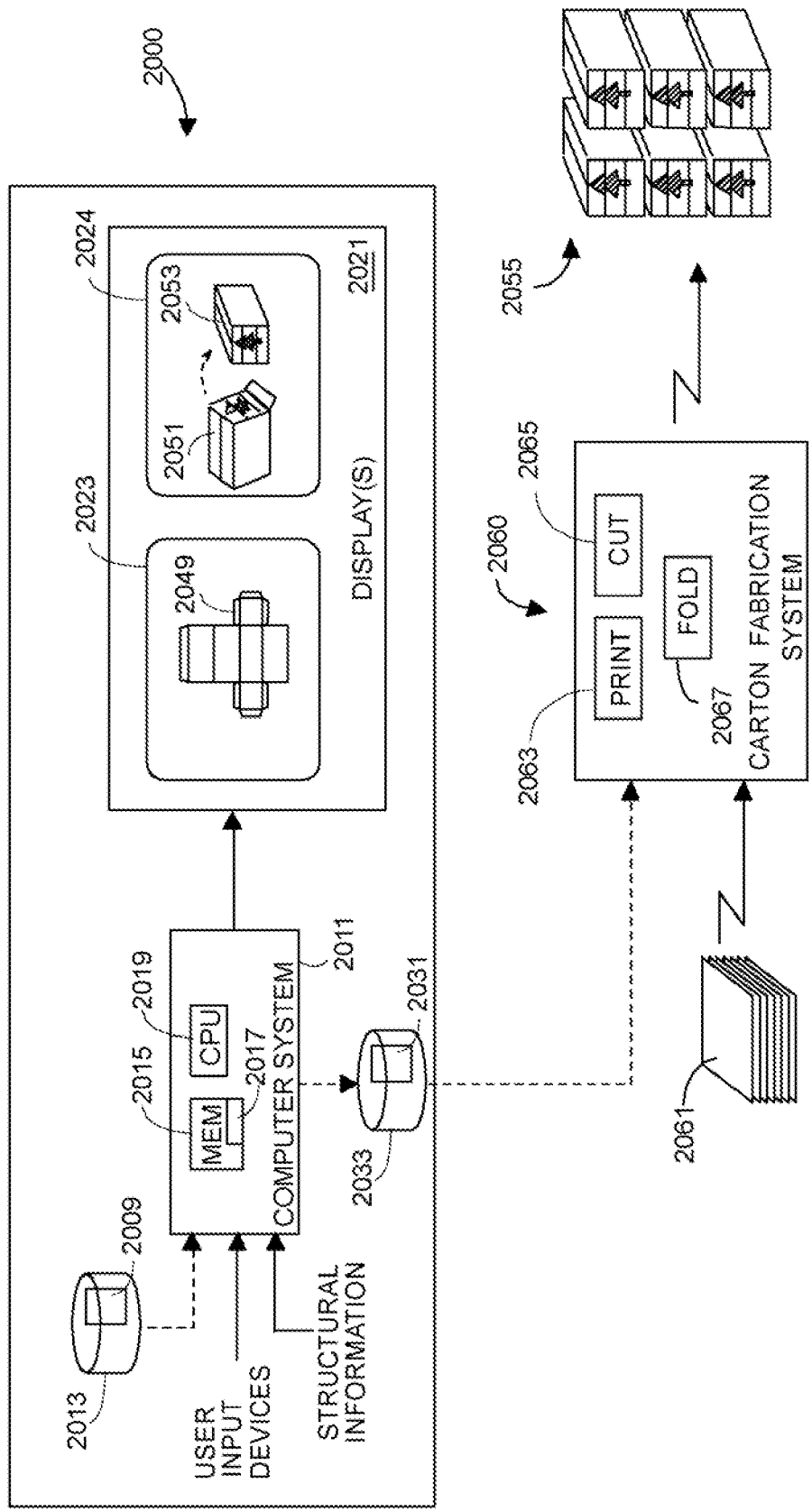
FIG. 20 depicts system components, including a computer system that can be used to carry out one or more method embodiments of the present invention.

The various methods of the present invention, and the method described by the flowchart of FIG. 19 are implemented on a processing system, e.g., a computer system. FIG. 20 depicts system components, including a computer system that can be used to carry out one or more method embodiments of the present invention, e.g., the method 1900 of the flow chart of FIG. 19. FIG. 20 shows a graphics creation processing system 2000 that includes a computer 2011 that has at least one processor 2019, e.g., a CPU and a storage subsystem that includes a memory 2015 that typically includes persistent and non-persistent memory. Stored or loadable into memory 2015 are instructions 2017 of a software program 2009 that when executed by processor 2019 will cause a method embodiment of the present invention to be carried out. As indicated in FIG. 20, in some systems, the complete set of programming instructions of the program 2009 that when executed implements the method may be stored on a storage medium 2013, such as optical or magnetic storage, to be read into computer 2011. Those skilled in the art will recognize the storage media 2013 may in fact be part of the computer system, or may be physically remote from computer 2011, and may, if desired, be accessed over a communications link such as the Internet, a network, etc.

Computer 2011 also receives as input carton structural information pertaining to the carton to be generated. This information may be in a file on storage 2013, or may be manually inputted by the user, or may be provided to the computer system in some other way.

As processor, e.g., CPU 2019 executes instructions of the program 2009, the graphics artist can create and then lay out the various graphic elements, e.g., images and/or text for the panel and flap areas of a carton. Commercially available graphic design software is known in the art, and may be used as part of program 2009 at this juncture. Alternatively, dedicated code may be included in software 2009 for this task. Exemplary commercially available software includes PackEdge, manufactured by Esko-Graphics of Gent, Belgium, ArtiosCAD and Score! made by Esko-Artworks of Gent Belgium.

Typically the graphics artist will use one or more input devices such as a mouse, a trackball, a joystick, a digitizer tablet, and even a computer keyboard to create such images, and/or to load images from memory 2015. Alternatively, the images may already be available as files in storage 2013, or otherwise be available. A vast quantity of images is available, for example, from commercial vendors, and can be downloaded from numerous websites via the Internet.

The computer system includes a display subsystem 2021 that includes one or more display screens. Two screens are shown in FIG. 20, and those in the art will understand that in alternate versions, the contents of the two screens 2023, 2024 may be shown as two windows in a single screen. The graphics artist can view on display screens 2023, 2024 views of the carton being designed. Shown in screen 2023 is a 2D unfolded view 2049 of the carton showing cuts and folds, while shown in screen 2024 are 3D shaded views 2051, 2053 of the complete carton corresponding to the unfolded view 2049. The displayed images may be manipulated and new images viewed. For example, as described in more detail below, the graphics artist can superimpose on a screen, e.g., display 2023, the created (and/or downloaded) graphics upon a planar outline of the carton 2049. Program 2017 uses the structural information to copy and position the images on the various flaps that contribute to the panel being worked on.

The rendering of the 3D view of the carton with one or more curved creases is one novel feature of some embodiments of the invention.

Since the structural information available to program 2017 includes folding details and characteristics of the substrate, the artist can readily determine areas of panels and flaps that need not be printed at all because they are covered by portions of other panels or flaps. At this juncture, appropriate clipping masks can be generated by program 2017 such that covered-over substrate portions are not needlessly printed with graphics. Further, appropriate clipping masks can reduce degradation of the printed imagery. In addition, the effects of ink bleeding into the substrate and into adjacent regions of the graphics are also reduced.

The graphics artist can also cause program 2017 to create a three-dimensional image of the carton replete with printed graphics. Two such images 2051, 2053 are shown as being displayed on screen 2024. In the left-hand image 2051, one of the side flaps is not yet folded, whereas in the right-hand portion of the display, the side flap has been folded through a 90° fold angle, and image 2051 has been rotated to permit in view 2053 an end-on view of the side flap and the composite image printed on the side panel. Note that while images 2051, 2053 show a carton that has substantially straight folds, the invention described herein is applicable also to cartons with one or more curved creases.

Once the graphics artist is satisfied that the images to be printed on the various panels and flaps have been properly created, program 2017 can generate an output graphics file 2031, shown here as being stored in a storage subsystem 2033 which may, in some embodiments, be the same as storage subsystem 2013. Creating the graphics files includes "unfolding" the 3D model to generate the 2D panels, e.g., ready for printing.

The remaining portion of FIG. 20 will now be described to illustrate the practical use of output graphics file 2031. A carton fabrication system 2060 is depicted in FIG. 20 as receiving data and information (collectively data) that is input from graphics file 2031, and also receiving as input raw planar substrate material 2061 that is to be printed with graphics, according to aspects of the present invention, and formed into cartons 2055. Carton fabrication system 2060 benefits from aspects of the present invention, but need not be considered part of aspects of the present invention.

In the broadest sense, system 2060 may be said to include a printing sub-system 2063 that is responsive to data on graphics file 2031, a cutting sub-system 2065 that is responsive to cutting data also present on graphics file 2031, and a folding sub-system 2067 that will fold already-printed, already cut and scored substrate along fold-lines, defined by data on graphics file 2031. In practice carton fabrication system 2060 may include other sub-systems and the various sub-systems may be located remotely from each other. For example in some applications it may be advantageous to print planar substrate material 2061 at one facility, and to then ship the printed planar substrates to another facility, perhaps a great distance away, for cutting and folding. Economics and equipment available at a given fabrication site may govern the choice of various possible implementations of carton fabrication system 2060.

In one embodiment, the output of system 2060 is in the form of completed cartons 2055, each of which has printed on relevant panels and flaps properly sized and oriented graphics, according to aspects of the present invention. For ease of illustration completed cartons 2055 are depicted in FIG. 20 in a closed configuration, e.g., as if merchandise to be shipped is already packed within the cartons.

In general, one feature of the invention is realistically modeling one or more curved creases for folding carton and corrugated package designs that include such curved crease(s), the modeling in 3D on a computer such as processing system 2000, that includes, for example, display(s) 2021.

The method includes calculating the shape of a folding carton or corrugated package design that has one or more curved creases.

One feature provides for automatically snapping together different parts of a package, and changing the shape of the package to show the correct 3D shape after it has been glued.

Example of Use

Returning again to the flow chart of FIG. 19, in 1903, carton structural information relating to the physical characteristics of the carton to be fabricated is input. Such information is typically already available to the structural designer of the carton. In one embodiment, this information includes parameters such as the overall length, width, and depth dimensions of the carton, the area and orientation of each surface, panel, and flap, the folding or score lines and fold angles associated the panels and flaps, and the fold order. Other structural information can include thickness and composition of the substrate, including ease of folding information.

In optional step 1905, the method includes accepting graphics for each surface or overall panel of the completed carton that is to bear graphics. The graphics may already exist, e.g., in the form of graphic files, or a graphics artist may create the graphics, e.g., on the processing system 2000. Even if the graphics are from an existing file, the graphics may still need to be manipulated so as to be suitable for printing on the final carton. Step 1905, if included, may be carried out only after the 3D model is obtained, so that the graphics can be placed while viewing the 3D folded carton.

In 1907 the method uses the carton structural information to create a 2D structural model of the substrate, and to display, e.g., on display system 2021 a two-dimensional image of the unfolded substrate, indicating where the cut lines and scoring or fold lines are located. The folds, cuts, and scores may, for example be displayed in different colors.

In general in this description, folds (fold lines, crease lines) are indicated by broken lines made up of alternating short and long dashes. Cuts are represented by non-broken straight lines. Bend lines—imaginary lines of regions where bending occurs indicating the directions of bends—are indicated by dotted lines. When a flat substrate includes a domain in which bending occurs and a domain in which no bending occurs, the boundary between such domains that are not fold lines are also indicated by unbroken lines, called boundary lines, and it would be clear to those in the art whether an unbroken line indicates a boundary line or a cut line from the context.

In 1909, the method uses the carton structural information to form a 3D model of the carton, and displays a perspective 3D view, e.g., a shaded surface view of the 3D carton. Details of forming the 3D folded model, that is, the folding of the 2D unfolded information to provide the 3D model is set forth in more detail herein under.

Note that in one embodiment operating on a system that includes a display subsystem 2021 with at least two screens, e.g., 2023 and 2034, the displays of the 2D view and of the rendering are shown simultaneously on two display screens of the display system 2021, as shown in FIG. 20, while in another embodiment, the 2D and 3D rendered views are shown as different windows of the same screen. In yet another embodiment operating on a system that includes a display subsystem 2021 with at least two screens, e.g., 2023 and 1934, initially the 2D and rendered 3D views are shown as different windows of the same screen, on which the user can indicate which display is to appear on a separate window.

As stated above, the graphics to be included can be placed with the air of the rendered 3D views.

Using one or more of various computer input devices such as a mouse, a trackball, a digitizer tablet, a keyboard, etc., the user, e.g., a carton designer can view the 2D unfolded display on the computer monitor. The user further can manipulate the carton, e.g., zoom in and out on the 3D view, rotate and tumble the 3D viewed model. If graphic files are input, e.g., in step 1905, the graphics also may be viewed and manipulated. FIG. 19 shows various tasks that can be performed once the 2D and 3D models are determined.

When satisfied, the method includes generating the 2D files for creating the carton.

Example Package

Figure 2:
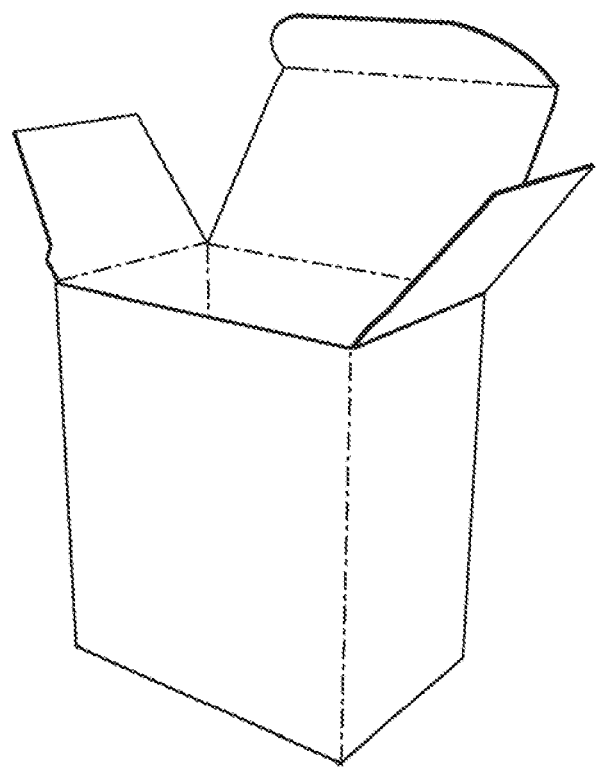
FIG. 2 shows a package design with straight creases folded up. When folded up in ArtiosCAD, it looks like FIG. 2.

As stated in the Background section, FIG. 1 shows a typical package design with straight creases, which, for example, can be designed and "folded" in current CAD software. By "folded" is meant herein that a 3D model of the carton can be built, e.g., starting with the unfolded design, and that views of the 3D folded carton can be displayed. Folding may include gluing for flaps. FIG. 2 shows perspective view of a package design with straight creases folded up, e.g., using a program such as ArtiosCAD.

Figure 3:
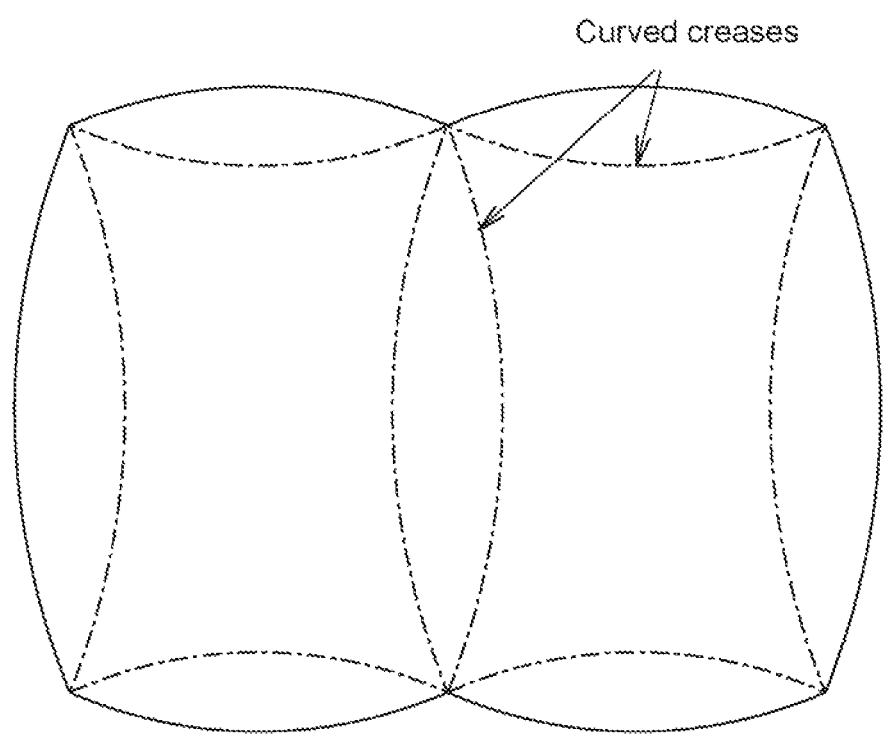
FIG. 3 shows an example design with curved creases, which cannot be folded in current CAD software.

FIG. 3 shows an unfolded view of an example carton design with curved creases, which cannot be accurately represented as a folded carton using present-day carton design software, such as the current (April 2008) version of ArtiosCAD.

Figure 4:
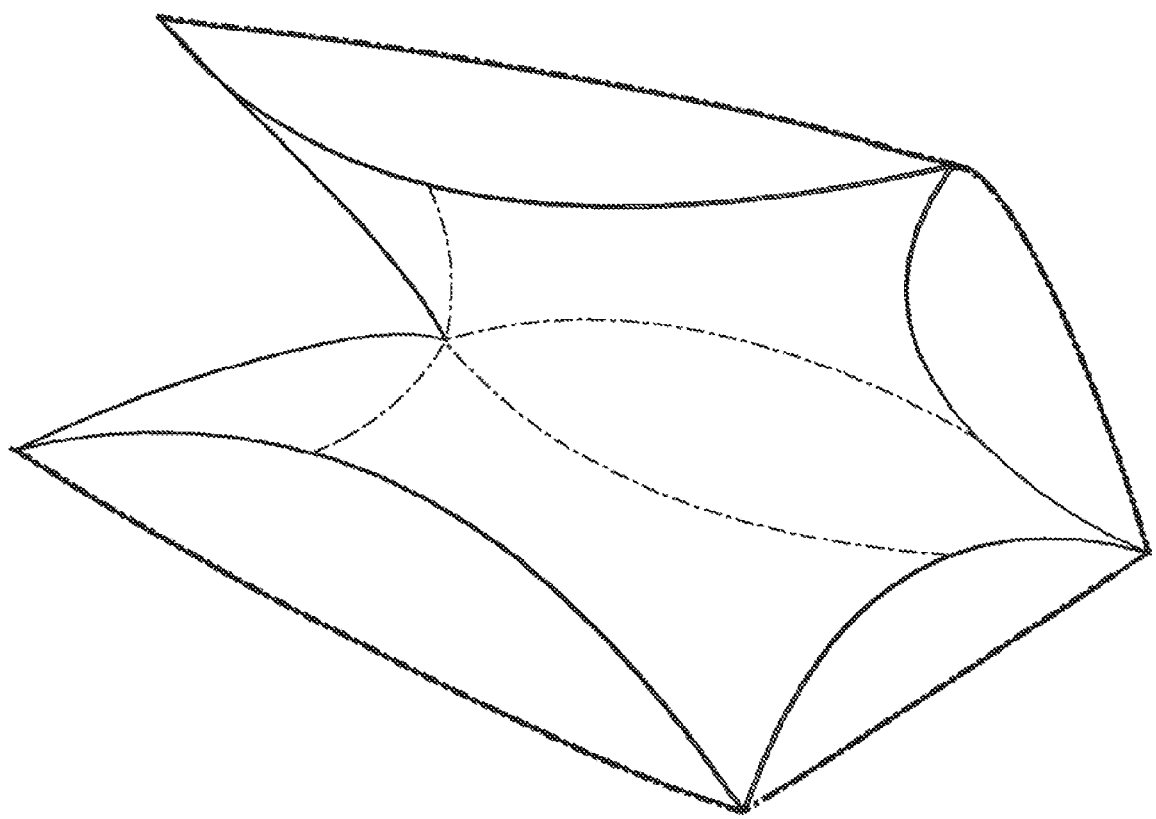
FIG. 4 shows a package design with curved creases folded up.

It is desired to model cartons with one or more curved creases and produce, as an example, 3D views such as FIG. 4 that shows the design of FIG. 3 when folded up.

Figure 5:
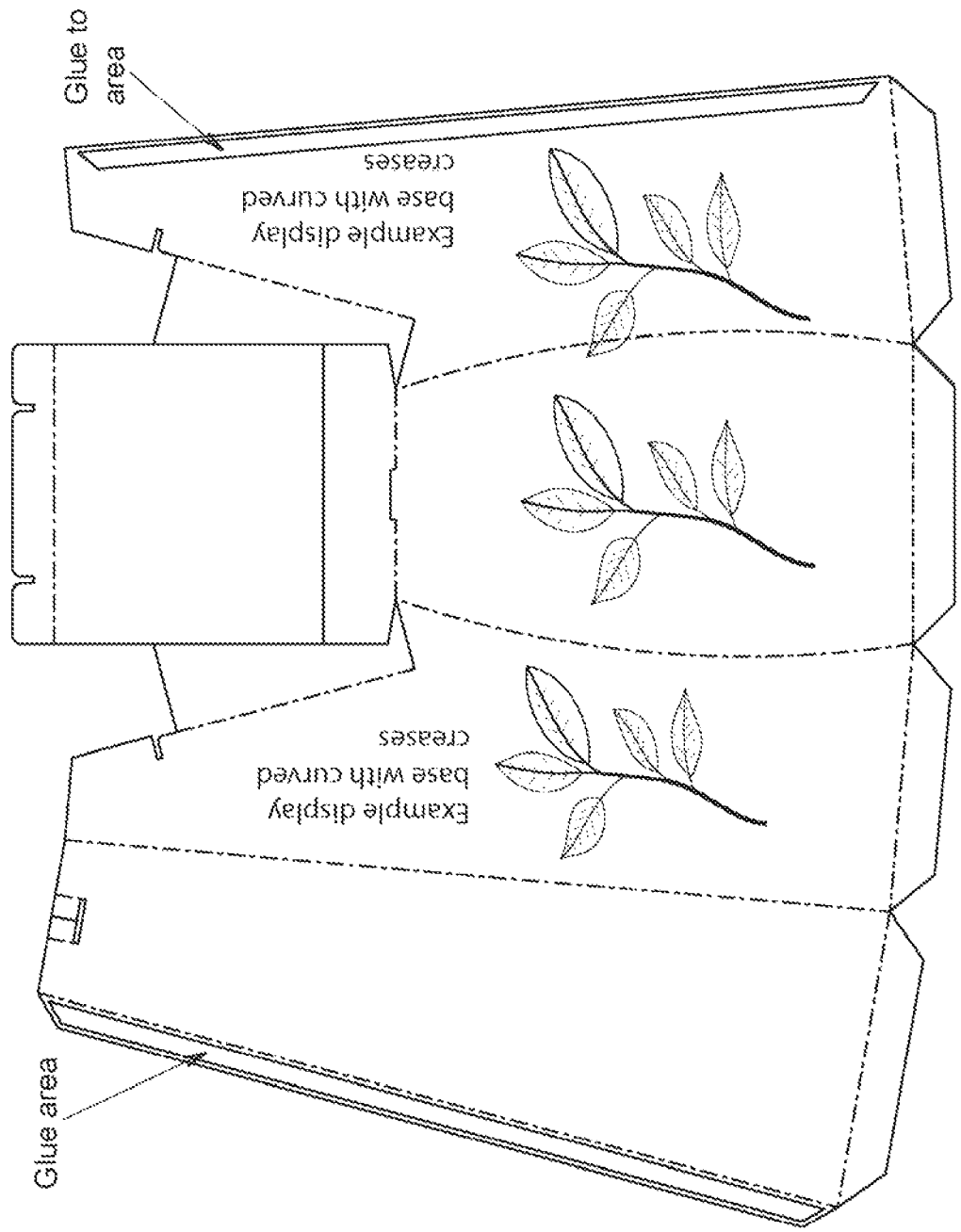
FIG. 5 shows a corrugated display base with curved creases and the glue areas indicated.
Figure 6:
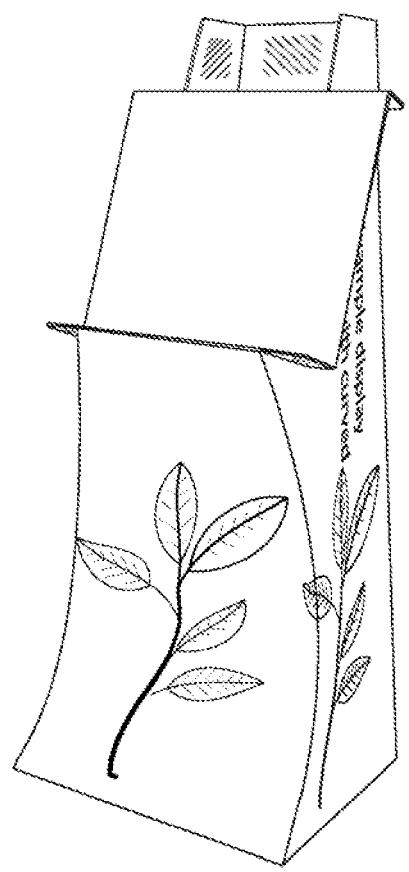
FIG. 6 shows the display base from FIG. 5 erected with glue areas snapped together.

Some designs of packages with one or more curved creases include glue areas, and the folding up includes gluing. The modeling of the folding needs to take the gluing into account in order to form the correct shape. As an example, FIG. 5 shows an unfolded view of a corrugated display base with curved creases and both a glue area and a glue-to area that matches the glue area as indicated. FIG. 6 shows how this design should look after the glue areas have been snapped together. It is desired to model packages such as these and to be able to display to a use perspective renderings of the folded (and glued) carton. It is also desired to be able to carry the folding up without the user needing to set the individual fold angles, which he or she may not have known from a simple view such as the unfolded view of FIG. 5, or dimensions thereon.

As already noted, many packaging CAD systems including ArtiosCAD and Score! can readily model straight creases in 3D. See also US 20050157342 and U.S. Pat. No. 7,346,408. Some general purpose CAD systems such as SolidWorks by SolidWorks Corporation of Concord, Mass. model bends in sheet metal, similar to straight creases in packaging. Some general purpose 3D CAD software also may provide the ability of join ("snap") parts together and see the results in 3D. See, for example, the "mate" feature in SolidWorks that provides such a property.

It is desired to provide accurate 3D models of packaging that includes one or more curved creases, and that allows for folding and gluing together flaps to form a 3D model from an unfolded sheet. The simulating of such gluing is different from the well-known "mate" feature of such 3D CAD software as SolidWorks because surface curvature and fold angles change as a result of gluing.

Method to Convert a 2D Design with Curved Creases to a 3D Representation

Figure 21:
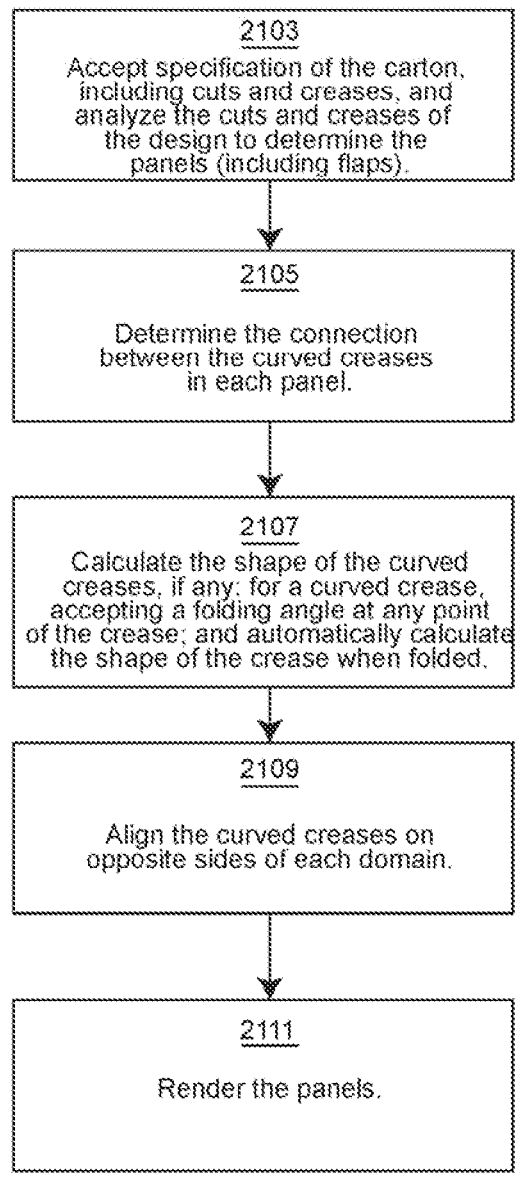
FIG. 21 shows a simplified flowchart of one embodiment of a method of converting a 2D design specification of a carton with one or more curved creases to a 3D representation.

One feature of the invention is the ability to convert a design, e.g., an unfolded 2D representation of a carton to a 3D representation. FIG. 21 shows a simplified flowchart of one embodiment of a method 2100 of converting a 2D design specification of a carton with one or more curved creases to a 3D representation, such a method 2100 implemented, for example, on a computer such as the computer 2011 of processing system 2000 of FIG. 2. The method 2100 includes the following steps:

Step 1 (2103): Accepting a specification, including cuts and creases, and determining the panels (including flaps) of the carton by analyzing the cuts and creases in the design.

Step 2 (2105): Determining the connection between the curved creases in each panel, allowing for gluing Step 3 (2107): Calculating the shape of the curved creases, if any.

Step 4 (2109): Aligning the curved creases on opposite sides of each domain.

Step 5 (2111): Rendering the panels.

Step 1: Analyzing the Cuts and Creases in the Design to Determine the Panels.

Figure 7A:
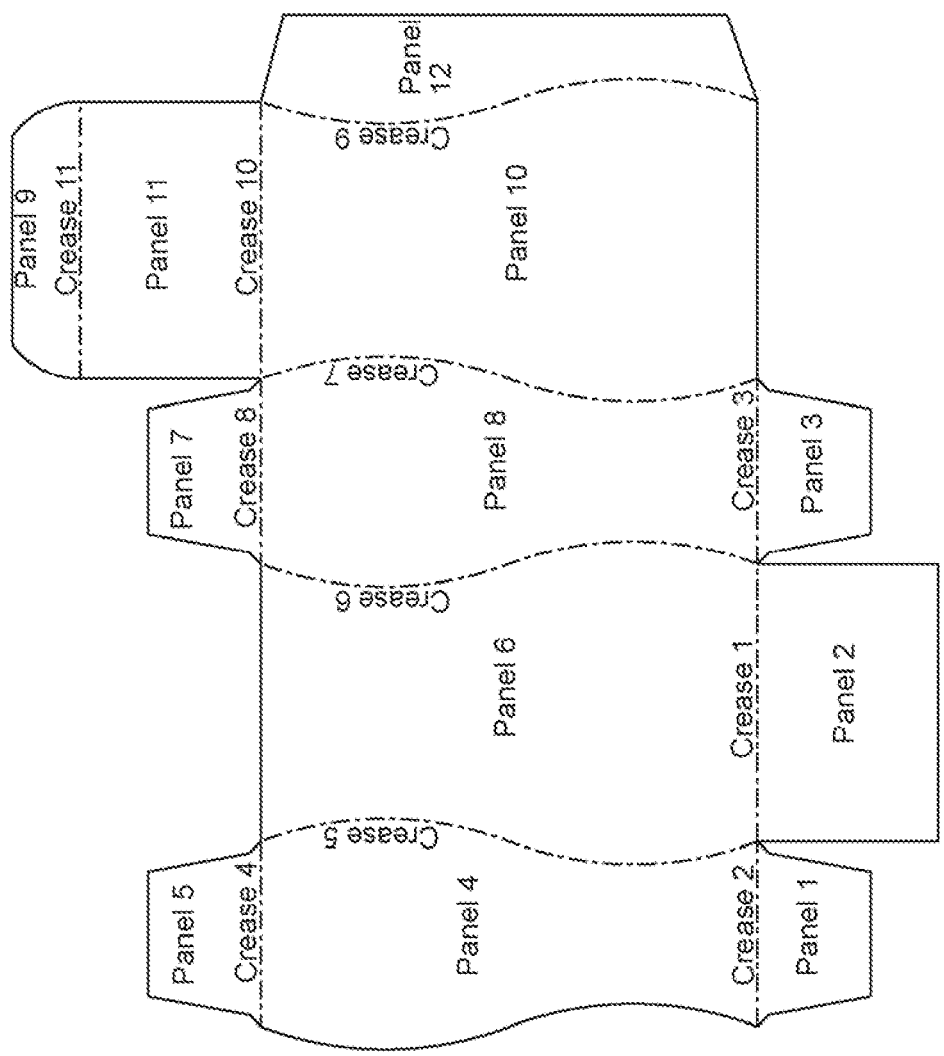
FIG. 7A shows an example design showing creases and panels.

The specification of the carton, e.g., of the unfolded 2D design includes specification of cut lines and crease lines. FIG. 7A shows an example an unfolded design of a carton showing creases and panels. A crease is made up of one or more straight lines or arcs joined together into a continuous curve. The design of FIG. 7A includes 11 creases labeled crease 1, crease 2, . . . , crease 11, respectively. The creases divide the design into panels. There are 12 panels labeled panel 1, panel 2, . . . panel 12, respectively. Note that some of the panels are flaps.

Each crease has a panel on either side. To determine the panels, one embodiment includes determining the panels on both sides of each crease as follows:

For each crease, e.g., a vertical crease that can have a panel on the left and on the right:

Pick a start point anywhere along the crease, e.g., in the middle of the crease.

Follow a path in the counterclockwise direction, such that at each intersection, a left hand turn is taken, until returning to the start point, to trace a path that forms an outline of the panel on one side of the crease a path.

Follow a path in the clockwise direction, such that at each intersection, a right hand turn is taken, until returning to the start point, to trace a path that forms an outline of the panel on one side of the crease a path.

Unite any duplicate panels, for example panel 10 in FIG. 7A is left of crease 9 and right of crease 7.

In the example in FIG. 7A, the method 2103 of determining the panels can determine that crease 9 has panel 10 on the left and panel 12 on the right, and that panel 10 has 3 creases numbered 9, 10 and 7.

Step 2: Determining the Connection Between the Curved Creases in Each Panel

In 2105, the method 2100 includes determining the connection between the curved creases in each panel. The connection between the creases depends on how many creases there are in the outline of the panel, how many of these creases are curved, and the alignment between them.

Before describing the connection, a discussion of what happens when flat sheet of substrate—a board, e.g., paper or carton board bends is appropriate.

How a Board Bends: Dividing Panels into Domains

Figure 8A:
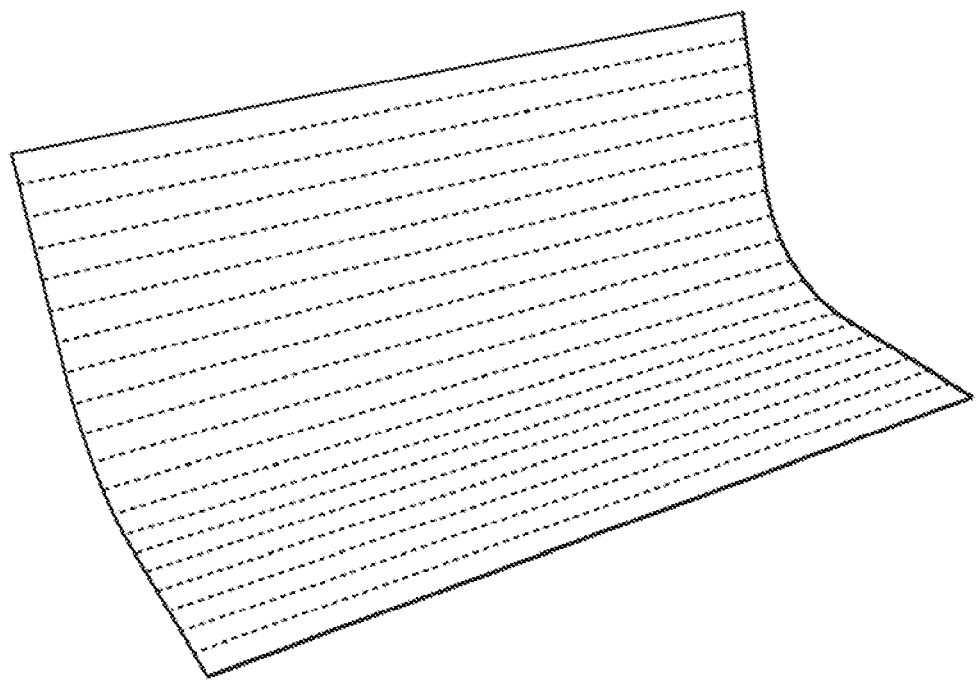
FIGS. 8A, 8B, 9A, and 9B respectively show in simplified form different bending situations for substrate material, also called a board herein.
Figure 8B:
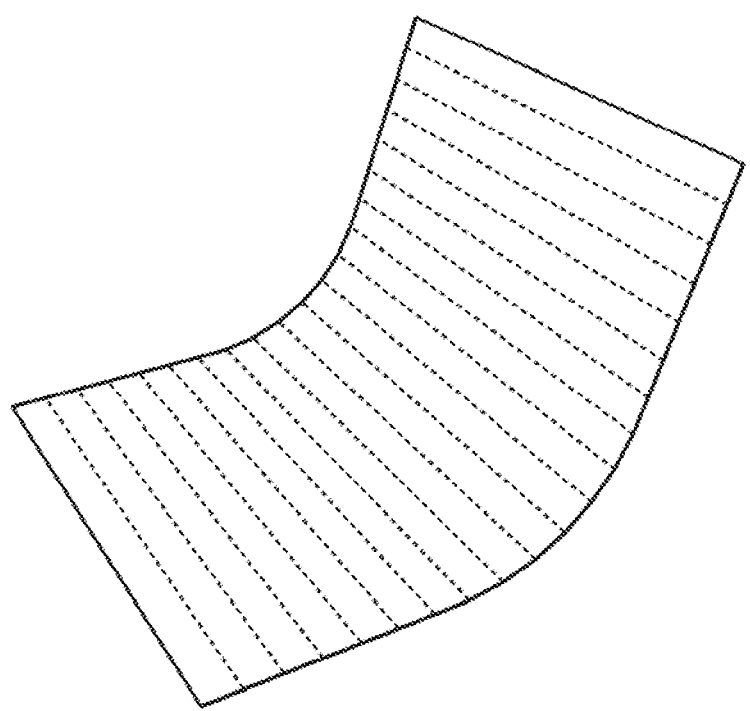
Figure 9A:
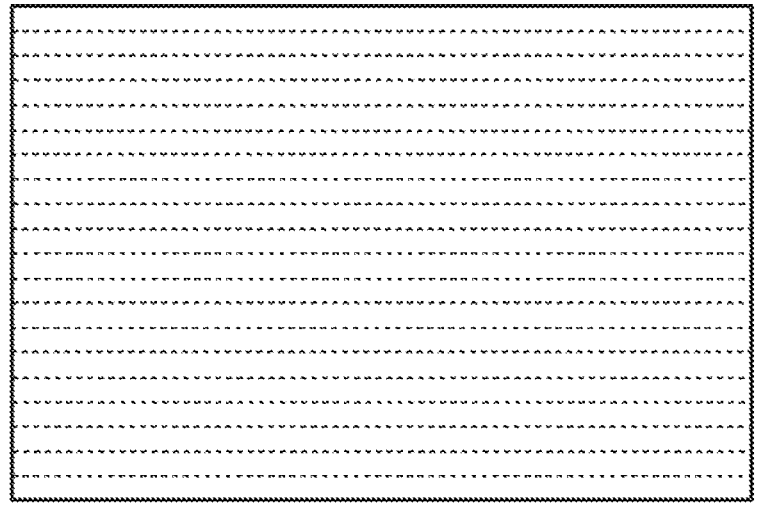
Figure 9B:
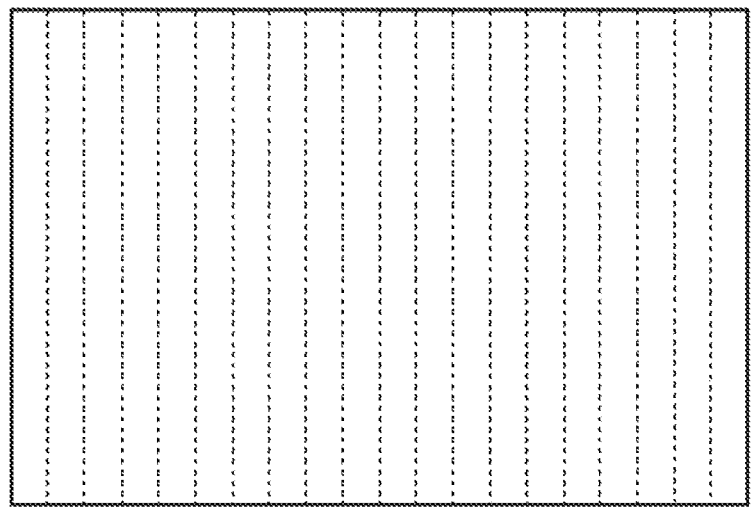

To understand how paper or carton board bends, assume that a piece of paper or carton board will only stretch by a limited amount, not more than 1 or 2 percent without tearing. Because of the limited stretch, the board can bend in any direction, but will not bend locally in 2 different directions at once. The direction of the bend can be represented by a set of bend lines that are across the panel and that do not cross each other. In the drawings herein, bend lines are presented by dotted lines. FIGS. 8A, 8B, 9A, and 9B respectively show in simplified form different bending situations, FIG. 8A shows a board bending along horizontal lines, FIG. 8B shows a board bending along vertical lines, FIG. 9A shows horizontal bend lines, and FIG. 9B shows vertical bend lines.

Figure 10A:
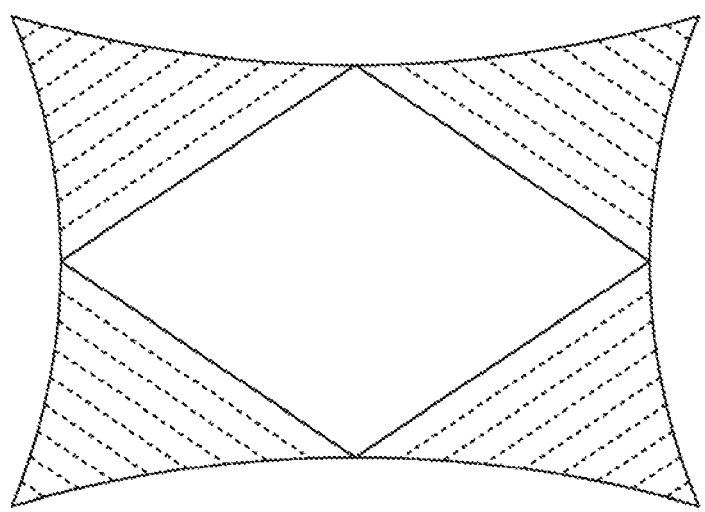
FIG. 10A shows an example of a panel divided into five domains.
Figure 10B:
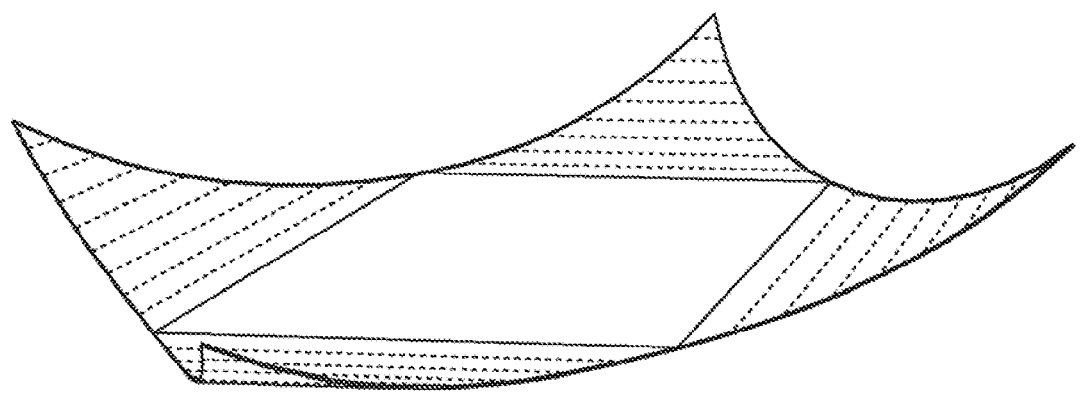
FIG. 10B shows an example of a panel appearing to bend in two directions.

In some cases it may seem that a piece of board or panel does bend in two directions at once. One feature of the modeling includes dividing each panel into one or more domains so that each domain, that is, the substrate in each domain only bends in one direction. FIGS. 10A and 10B show examples of panels that include several domains. In the example in FIGS. 10A and 10B, the panel can be divided into five domains; each corner domain bends in a different direction, while the center domain remains (approximately) flat. Note that the boundary of the center region is indicated by solid lines that are boundary lines. FIG. 10A shows an example of a panel divided into five domains, while FIG. 10B shows an example of a panel that appears to bend in two directions.

FIGS. 11A, 11B, 11C, 11D, 11E, and 11F show examples of different types of panels and how they can be divided into domains such that in each domain, any bending is in one direction.

Figure 11A:
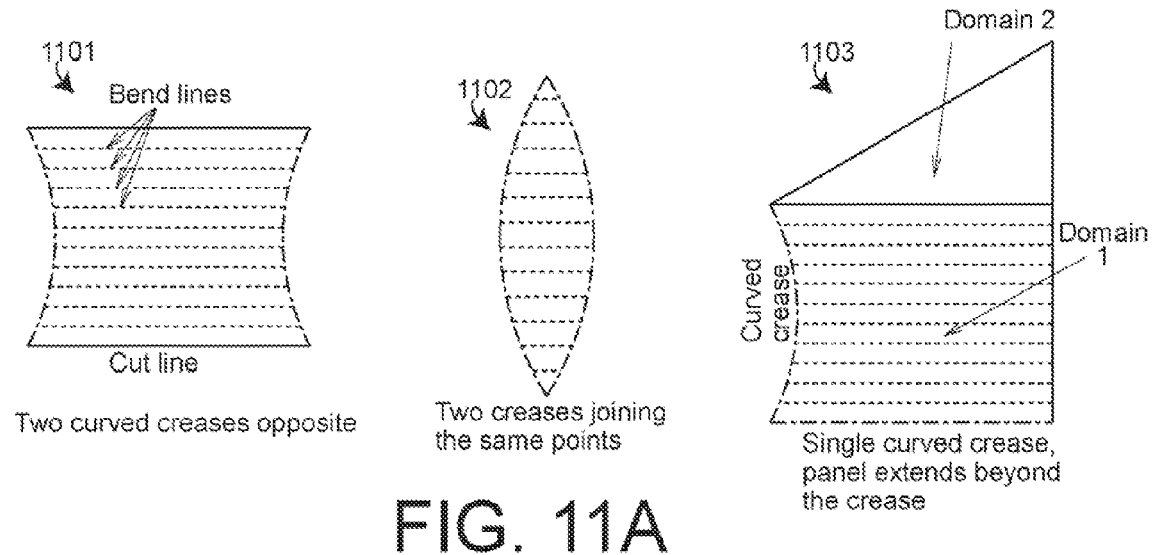
FIGS. 11A, 11B, 11C, 11D, 11E, and 11F show examples of different types of panels and how they can be divided into domains.

FIG. 11A shows an example 1101 of two curved creases that are opposite each other, an example of 1102 with two creases that join at the same points, and an example 1103 with a single curved creases, there being a panel (domain 2) that extends beyond the curved crease.

FIG. 11A shows an example 1101 with two curved creases that are opposite each other, an example 1102 with two creases that join at the same points, and an example 1103 with a single curved creases, there being a panel (domain 2) that extends beyond the curved crease.

Figure 11B:
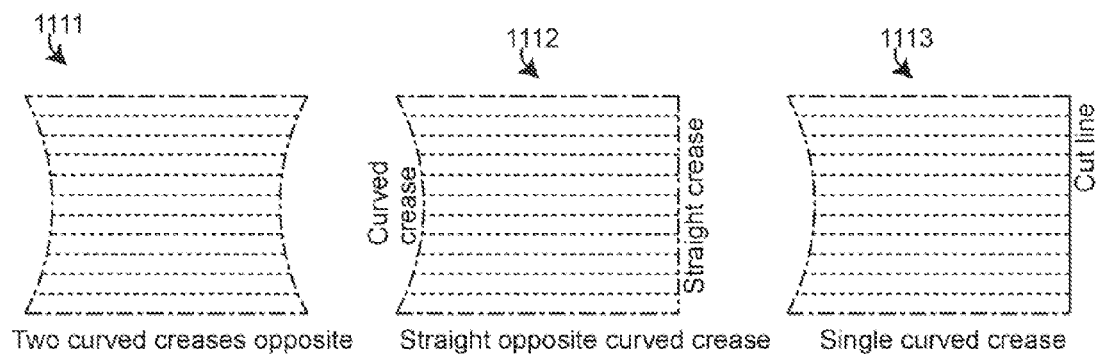

FIG. 11B shows an example 1111 with two curved creases that are opposite each other and two straight creases that are opposite each other, an example 1112 with a curved crease opposite a straight crease, and an example 1113 with a single curved crease and a cut line.

Figure 11C:
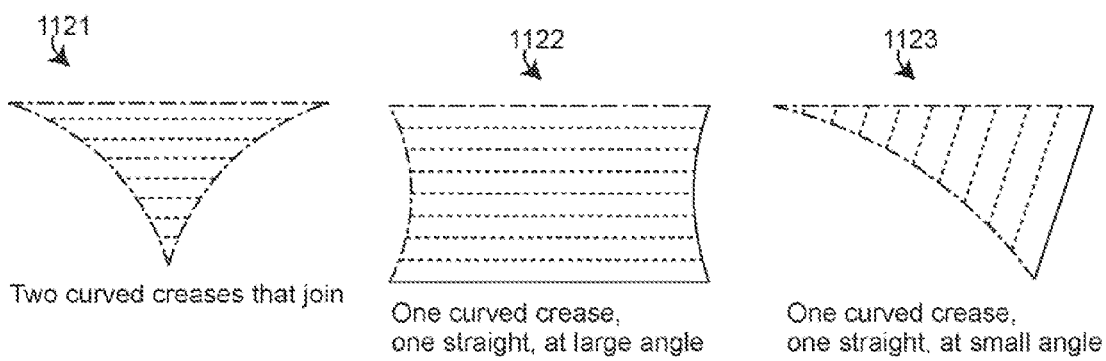

FIG. 11C shows an example 1121 with two curved creases that join at a point and a third straight crease, an example 1122 with one curved crease and one straight crease that join at a point at a relatively large angle to each other, and an example 1123 with one curved crease and one straight crease that join at a point at a relatively small angle to each other.

Figure 11D:
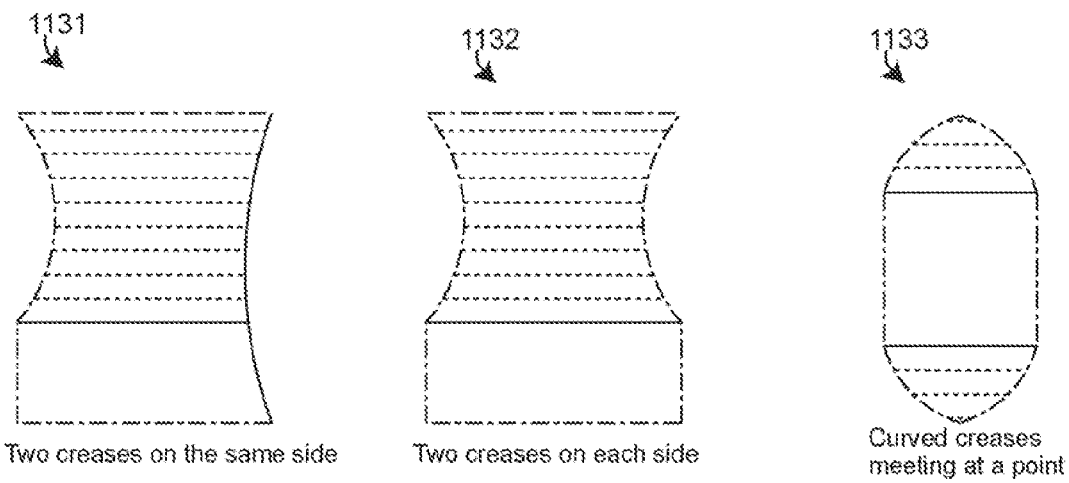

FIG. 11D shows an example 1131 with two creases on the same side, and example 1132 with curved creases meeting at a point, and an example 1133 with two creases on each side.

Figure 11E:
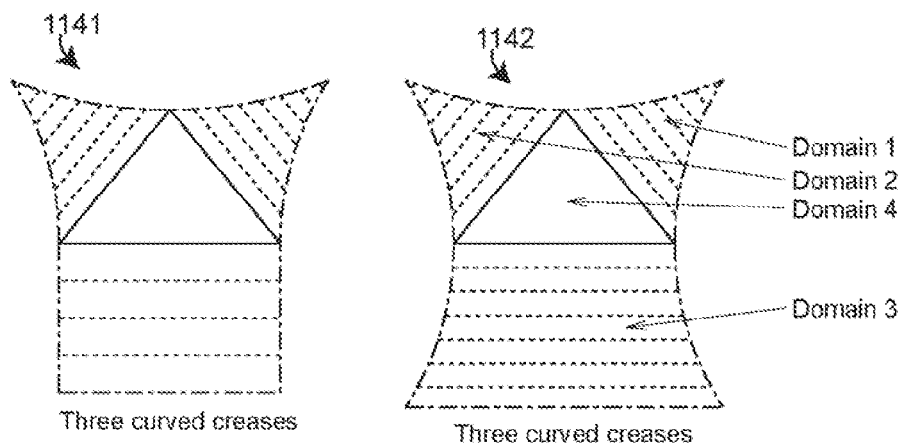
Figure 11F:
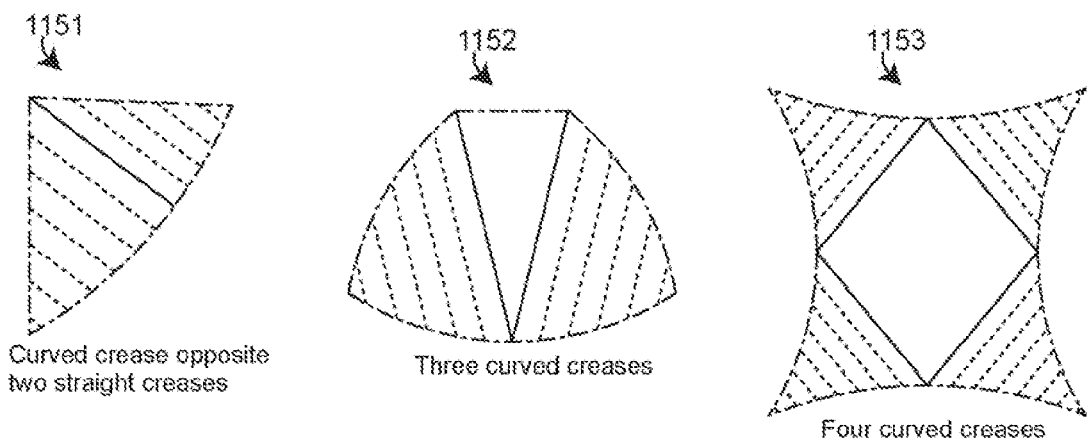

FIG. 11E shows an example 1141 with three curved creases, and an example 1142 with three curved creases FIG. 11F shows and example 1151 with curved crease opposite two straight creases, and example 1152 with three curved creases, and an example 1153 with four curved creases.

Some of the example panels of FIGS. 10A, 10B, 11A, 11B, 11C, 11D, 11E, and 11F, are used herein as examples to demonstrate features of the present invention.

Divide a Panel into Domains

Thus one embodiment includes dividing each panel into one or more domains such that in each domain, any bending is in only one direction. Given the outline of a panel with one or more curved creases, in most practical cases, the panel can be divided into domains in such a way that each domain has at most two curved creases. For example, in the case of a panel such as shown in unfolded view in FIG. 10A, each corner domain has two halves of two different curved creases. The center domain has no creases. Note again that the boundary of the central domain is indicated by solid lines.

One embodiment of dividing a panel into domains includes the following steps:

Select a direction for traversal, e.g., counterclockwise.

Traverse the outline in the selected direction, and list of the creases on the outline of the panel arranged according to the selected order of traversal, e.g., counterclockwise.

Divide each crease into two halves, called "half-curves": a first half-curve and a second half-curve, in counterclockwise direction around the panel.

One embodiment of a method of dividing a panel into domains includes partitioning the half-curves into sets, each having two half-creases, where half-curves in a set never point loin) half-curves in other sets. These sets for what are called the contours of the domains.

To do this, according to one embodiment, initialize two variables denoted join1 and join2 for each crease. FIGS. 18A and 18B show pseudocode for method embodiments for initializing the variables join1 and join2 for each crease. The pseudocode of FIGS. 18A and 18B are referred to as LoopA and LoopB herein.

Figure 12:
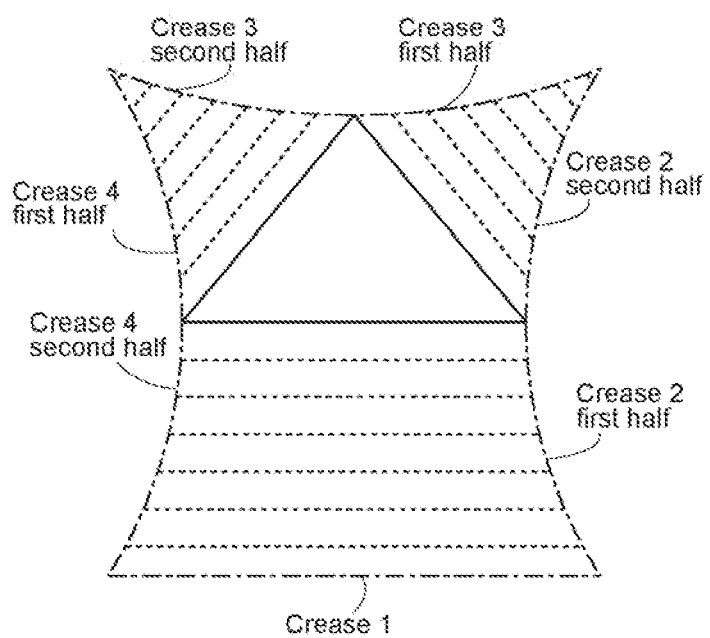
FIG. 12 shows an example panel having three curved creases, and how a method of dividing the panel into domains proceeds.

FIG. 12 shows an example panel having three curved creases. Starting with the bottom, the traversal continues in a counterclockwise direction and determines the four creases, in order, including dividing each curved crease into a first and a second halve. The ordering is thus: crease 1; crease 2, first half, crease 2, second half, crease 3, first half, crease 3, second half, crease 4, first half, and crease 4, second half. In the example in FIG. 12, the pseudo-code fragment LoopA sets the second half of crease 2 to point to the first half of crease 3 and vice-versa, and the second half of crease 3 to point to the first half of crease 4. Code fragment LoopB joins the first half of crease 2 to the second half of crease 4.

This would be represented by:

crease[1].join1=null; crease[1].join2=null;
crease[2].join1=4; crease[2].join2=3;
crease[3].join1=2; crease[3].join2=4;
crease[4].join1=3; crease[4].join2=2;

Which creases are joined together, and thus the domains, are defined by the values of join1 and join2.

Thus a method of dividing a panel into domains includes partitioning the half-curves into sets, each having two half-creases, where half-curves in a set never point loin) half-curves in other sets. These sets for what are called the contours of the domains.

Gluing

Figure 7B:
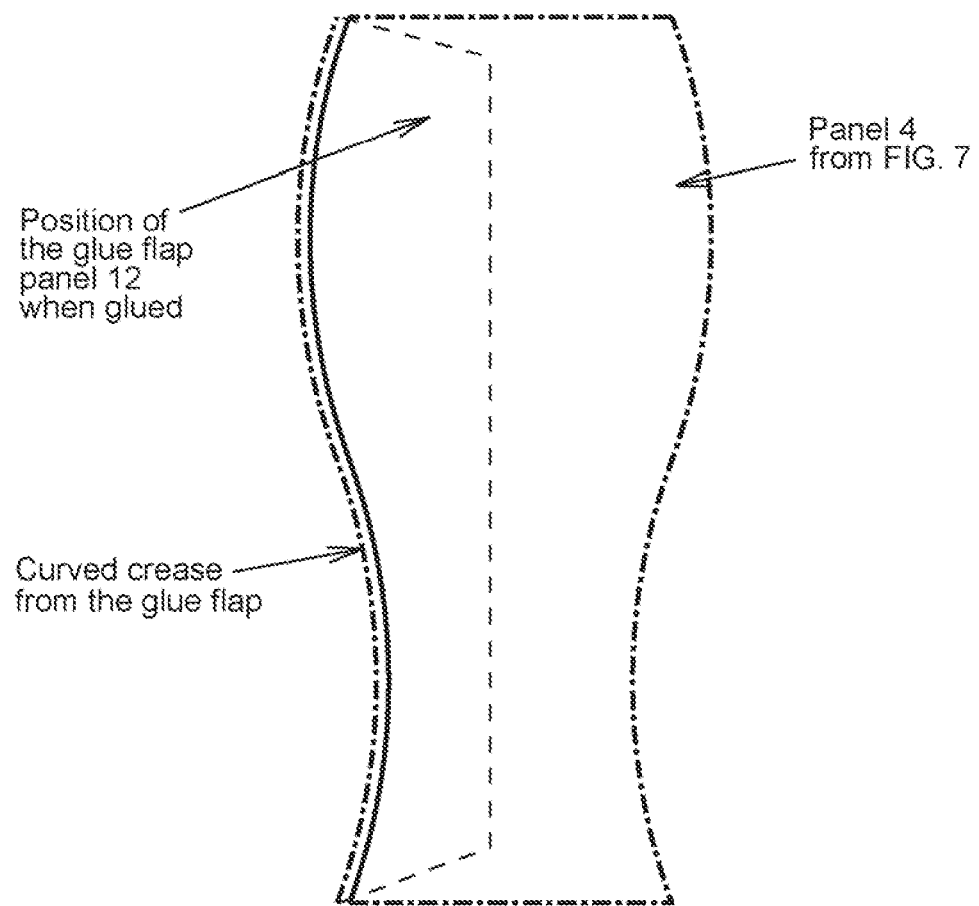
FIG. 7B shows how the flap of the example of FIG. 7A is glued onto a panel of FIG. 7A to form a panel with two opposite curved creases, according to a feature of the present invention.

In some embodiments of the invention, the method or methods described hereinabove for dividing panels into domains includes taking into account gluing of panels (flaps) onto parts of other panels. When two panels are glued together, the resulting panel can be considered to have the creases from both panels. FIG. 7B shows how the flap of the example of FIG. 7A is glued onto a panel of FIG. 7A to form a panel with two opposite curved creases, according to a feature of the present invention. For example, the glue flap Panel 12 is glued to Panel 4. Before gluing, Panel 4, has one curved crease, but after being glued to Panel 12, in accordance to a feature of an embodiment of the present invention, it is considered to have two opposite curved creases. The additional crease affects this step of dividing the panel into domains, and thus affects the resulting 3D shape.

In one embodiment, the gluing includes applying constraints on the bending.

In another embodiment, the bend characteristics of the board is changed as a result of the gluing.

Step 3: Calculating the Shape of the Curved Creases

In one embodiment, calculating the shape of a curved crease includes dividing the crease into small straight line segments, with a bend line emanating from each end of each straight line segment. Assume that in the immediate vicinity of each crease, the board can be considered as being made up of small planes next to each straight line segment.

Initially, the calculation of the shape of the crease is carried out as if the board had no thickness, and would not stretch. The method later can take into account the thickness. The rationale for so making the assumption is discussed hereinabove in the "How a board bends: dividing panels into domains" section.

By so dividing a curve into small straight line segments and assuming in that the region next to each line segment, the board can be considered as being made up of planar areas. Experiments have shown found that this provides an accurate visual representation for panels whose size is least 25 times the thickness of the board. Thus in one embodiment, each of the panels that have at least one curved crease has a size, e.g., a width and a height that is least 25 times the thickness of the substrate.

Figure 13A:
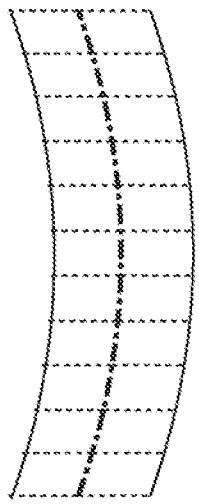
FIGS. 13A and 13B shows the crease divided into segments, in 2D and 3D, respectively.
Figure 13B:
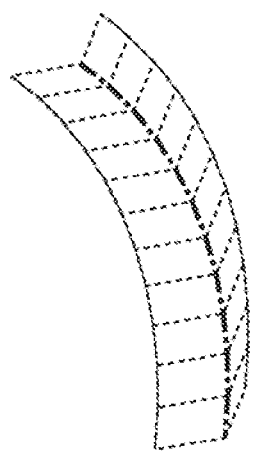

FIG. 13A shows an example of an unfolded 2D view of a crease, the fold lines dividing the crease into segments. FIG. 13B shows the 3D view of this crease when folded.

Figure 14A:
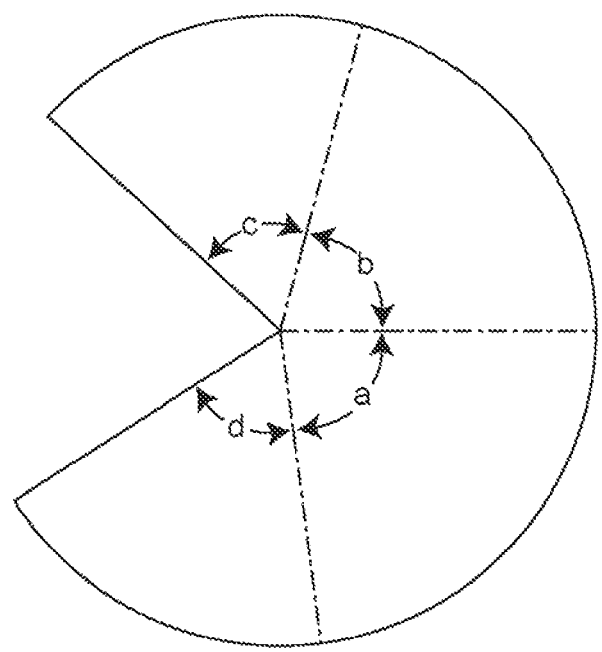
FIG. 14A shows a unit circle with 4 sectors.
Figure 14B:
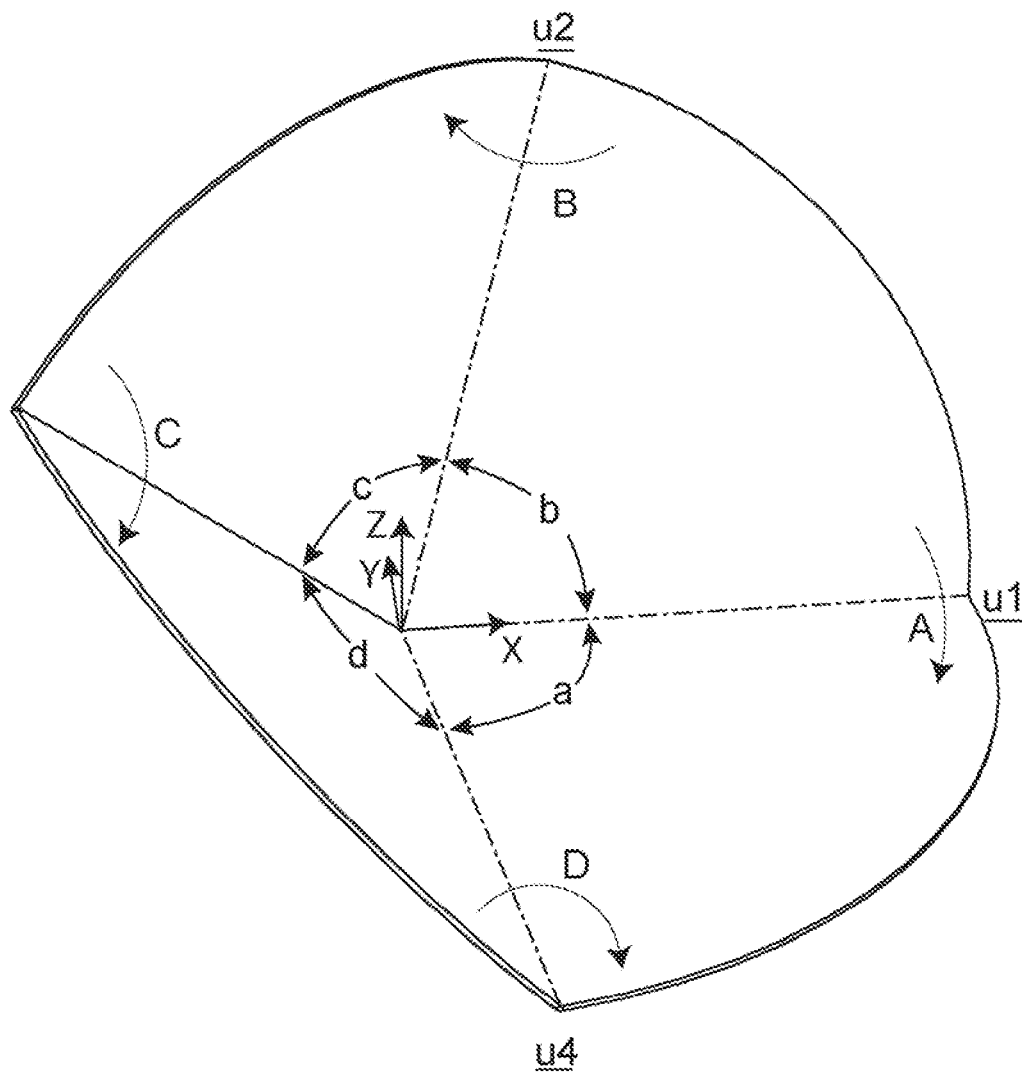
FIG. 14B shows the sectors from FIG. 14A folded to meet.

Consider now a join of one or more crease lines. There are planar areas around the join made up by the segments of the crease lines. Suppose there is a circle, e.g., a unit circle around the meeting point of two or more crease line segments that meet at a point. FIGS. 14A and 14B show, by way of example, one way of determining the relationship between the angles between the meeting crease lines in the unfolded view, denoted a, b, c and d in the unfolded view of FIG. 14A with the angles of the planar areas of the crease segments when the carton is folded, these angles denoted A, B, C and D in the folded sectors shown in FIG. 14B. Thus, to calculate the relationship, and the resulting shape of the crease, considering a unit circle around the point the angles a,b,c and d meet. FIGS. 14A and 14B show a segment of the unit circle divided into 4 smaller sectors with angles a,b,c,d in the flat and solid angles A,B,C,D in the folded view.

In this, assume a,b,c,d are known, and suppose also that one of the solid angles, say A is known. It is desired to determine B,C and D.

Denote by u1, u2, and u4 respective unit vectors from the origin, defined as the meeting point of the crease lines, along three of the fold lines. Note the definition of the x,y and z axes from the origin. Because the circle is of unit length, the unit vectors u1, u2, and u4 are along the circle as shown in FIG. 14B.

Suppose the panel between u1 and u4 is placed horizontal so that u1 is along the X axis and u4 is in the XY plane. Then $$u1 = (1, 0, 0)$$

$$u2 = (\cos b, -\sin b, 0) \text{ rotated by angle } A \text{ about the } X \text{ axis,}$$
$$= (\cos b, -\sin b \cdot \cos A, \sin b \cdot \sin A), \text{ and}$$

$$u4 = (\cos a, -\sin a, 0).$$

Let sub denote the angle between u2 and u4, and let cos sub denote the cosine of this angle sub. Then $$\cos sub = u2 \cdot u4 = \cos a \cos b + \sin a \sin b \cos A,$$

where "·" between vectors denotes the dot product. Similarly, swapping a with c, b with d, $$u2 \cdot u4 = \cos c \cos d + \sin c \sin d \cos C$$

So that $$\cos C = (\cos sub - \cos c \cdot \cos d)/\sin c \cdot \sin d. \text{ Thus}$$

$$C = \arccos((\cos sub - \cos c \cdot \cos d)/\sin c \cdot \sin d), \quad \text{[Formula 1]}$$

so that given a,b,c,d and A, the angle C is determined by Formula 1.

B and D are determined in one embodiment as follows. Let sin sub be the sin e of angle sub $$\sin sub = \text{sqrt}(1 - \cos sub * \cos sub)$$

Define angles b1 and b3 by the relationships:

$$\cos b1 = (\cos d - \cos sub \cdot \cos c)/\sin sub \cdot \sin c;$$

$$b1 = \arccos(\cos b1);$$

$$\cos b3 = (\cos c - \cos sub \cdot \cos d)/\sin sub \cdot \sin d;$$

$$b3 = \arccos(\cos b3),$$

Define vector $n1 = u2\textasciicircum u1/|u2\textasciicircum u1|$, where ˆ denotes the three-dimensional cross product and || denotes the length of a vector.

Let $n2 = u2\textasciicircum u4/|u2\textasciicircum u4|$.

Let $n3 = u1\textasciicircum u4/|u1\textasciicircum u4|$.

Those in the art would recognize that these n's are the normals on the planes defined by the unit vectors.

Let $c1 = \arccos(n1 \cdot n2)$

Let $c3 = \arccos(n2 \cdot n3)$

These c1, c3 are the angles between the normals n1 and n2, and n2 and n3, respectively.

From this, one can determine the following three formulae:

$$C = \arccos((\cos sub - \cos c \cdot \cos d)/\sin c \cdot \sin d) \quad \text{Formula 1}$$

$$B = \pm c1 \pm b1 \quad \text{Formula 2}$$

$$D = \pm c3 \pm b3 \quad \text{Formula 3}$$

Formula 1, Formula 2, and Formula 3, provide the relationship between A,B,C, and D and a, b, c, and d.

The method includes applying these formulae to two consecutive crease segments in order to determine the angles between the planes adjacent to the small segments next to the crease segments.

Note also that in each of Formula 2 and Formula 3, there is an ambiguity—a + and a −. Because each crease segment is short, angles C and D in practice will be close to 180 degrees. In practice, only one solution for each angle Formula 2 and Formula 3 is close to 180 degrees. Thus, when applying the formulae, one selects the solutions that give angles close to 180 degrees.

Figure 15A:
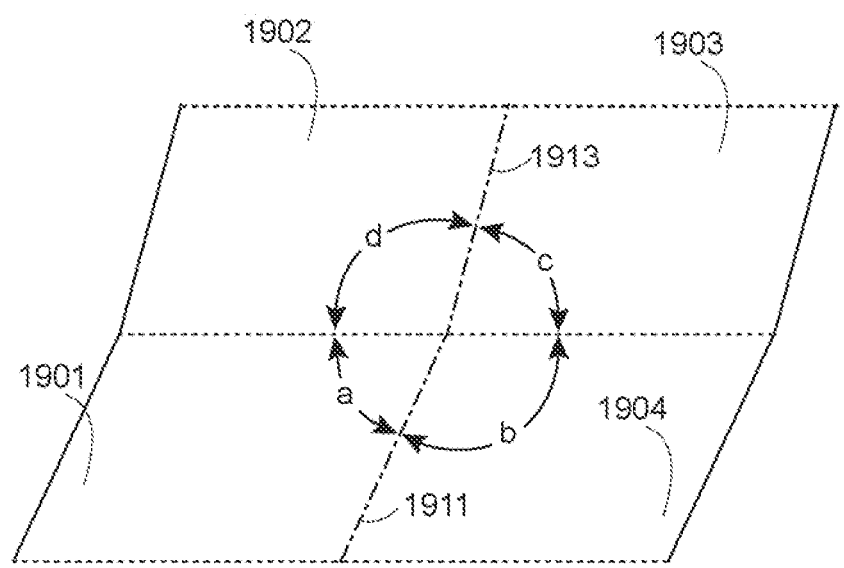
FIG. 15A shows consecutive crease segments when flat.

As an example, consider FIG. 15A that shows consecutive crease segments 1911 and 1913 in a close-up when unfolded. The board is treated as if it can be divided into the shown four rectangular parts 1901, 1902, 1903, and 1904, each planar. The inventor has found that, for example, for substrates that have relatively small stretch, so considering the curved surfaces to being made up of such small rectangles in the vicinity of a crease provides useful results. By so dividing a curve into small straight line segments, and assuming in the region next to each line segment, the method is reduced to dealing with the small segments that are planar. Manipulating such small planar rectangles is carried out suing the formulae derived above. The board thickness is considered negligible, and the inventor has found provides usable visual representation for at least panels whose size is least 25 times the thickness of the board.

Figure 15B:
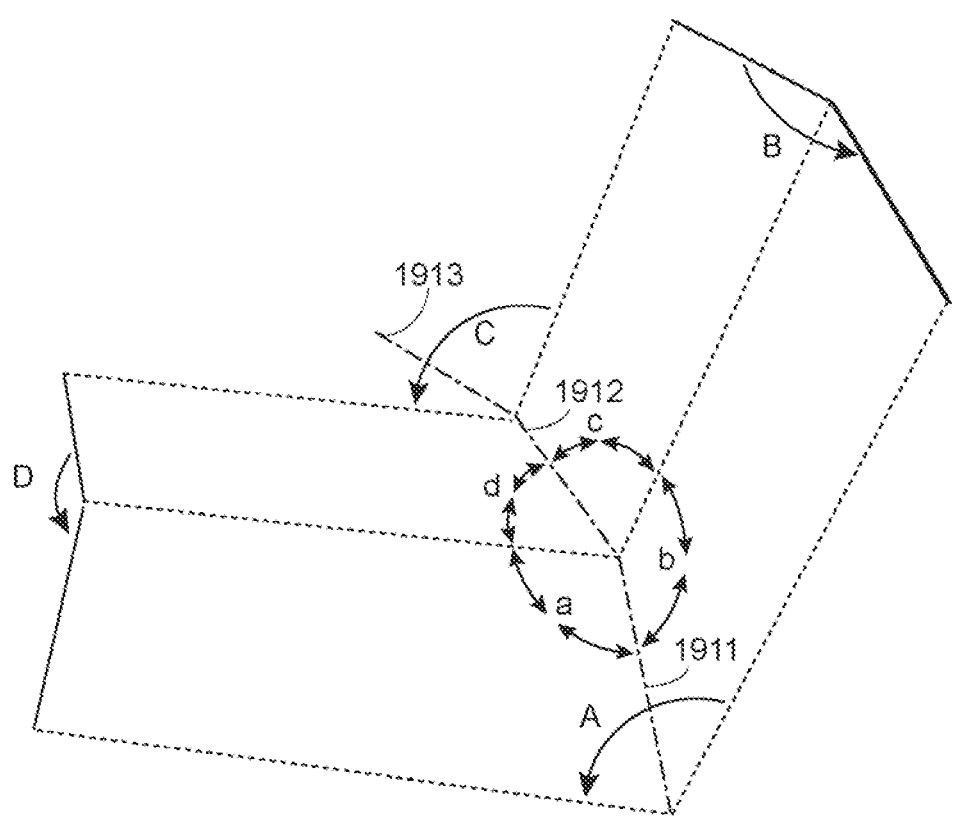
FIG. 15B shows angles of consecutive crease segments when folded.

FIG. 15B shows angles of consecutive crease segments when folded.

As part of apply these formulae in use, a user, e.g., viewing an unfolded view, sets the angle of the curved crease. In one embodiment, a computer program that implements the method provides a graphical user interface for folding by a selected angle. In one embodiment, a "Fold Angle" clickable tool is presented on the user interface. The used clicks the presented Fold Angle tool, clicks on a crease on the 2D unfolded view at which the fold is to occur. In one embodiment, a slider is presented for setting the fold angle, and the user slides the slider. In an alternate or in addition, a space is provided for the user to type in a fold angle, and the user types in such an angle. Other techniques for setting the angle also are possible, as would be clear to one in the art.

As an illustrative example, consider again the unfolded view of FIG. 15A. Suppose the user sets the angle A shown in FIG. 15B between planar regions 1901 and 1904. Once A is selected, Formula 1, Formula 2, and Formula 3 determine the other angles B, C, and D for the two segments 1911 and 1912. Angle C then becomes the angle A for two more segments—the second 1912 and the next segment of the crease shown as 1913 in FIG. 15B. Formulae 1, 1 and 3 then determine three more angles of segments 1912 and 1913. This is repeated for all segments of the crease, and thus the segments of the crease, and the folded model is determined.

While the angles add up to 360 degrees in the drawings shown, this is not a necessary assumption. The Formulae 1 through 3 above did not require an assumption that the angles add up to 360 degrees.

The solid angles of the crease determine the 3D shape of the curved crease.

Note that the first crease angle is defined, e.g., provided by the user to the program, and can be at any selected point in the crease. The method then automatically applies the formulae to segments emanating from that point, e.g., in both directions away from the selected point in the case that the selected point is not at the end of the curved crease.

Step 4: Aligning the Curved Creases on Opposite Sides of Each Domain

Aligning the curved creases on opposite sides of each domain uses the segments for each crease as calculated in step 2. One embodiment includes determining quantities that maintain constancy in the average length of the bend lines between creases, that is, the average length of the bend lines in the 2D flat between two opposite creases is the same as the average of the length of the bend lines in the 3D folded carton between the creases.

One embodiment method includes calculating the average 3D unit vector along the segments of the crease, and, for a vertically oriented crease, orienting the crease on the right so that the average unit vector of the crease on the right is opposite and pointing towards the average unit vector of the crease on the left. The method further includes making the average length of the bend lines between the creases in 3D the same as the average length of the bend lines in 2D.

Figure 16A:
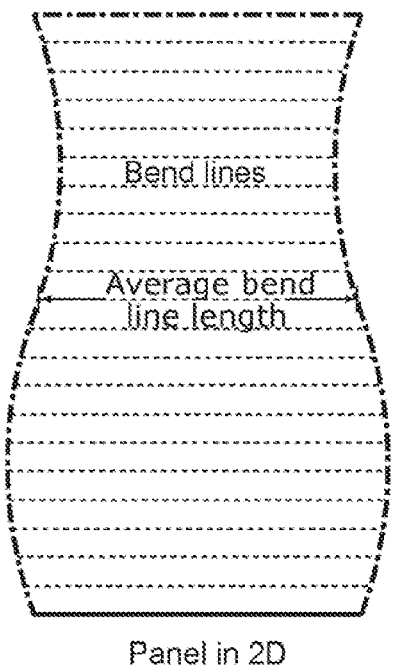
FIGS. 16A and 16B show an example of aligning creases on opposite sides of a domain.
Figure 16B:
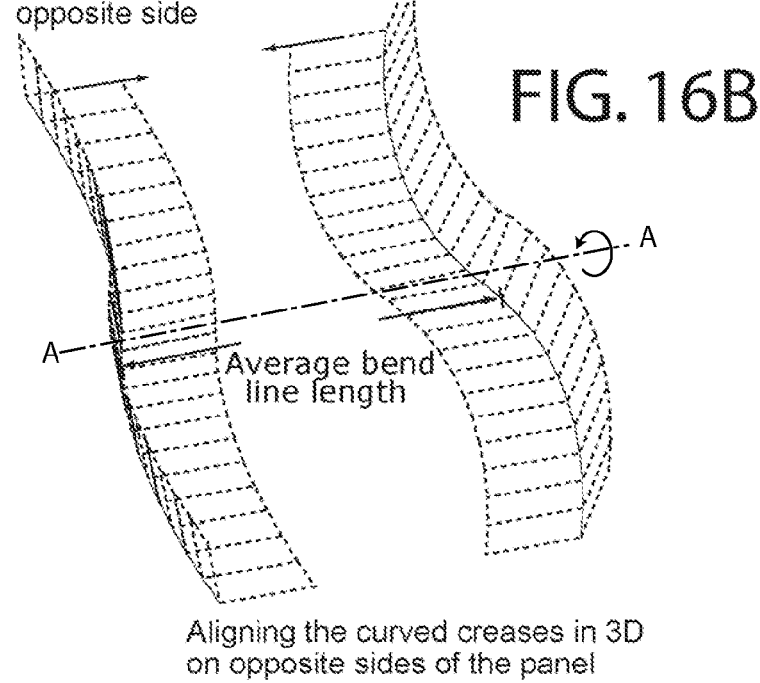

FIGS. 16A and 16B illustrate this for a simple example domain that has curved creases on opposite sides. In more detail, FIG. 16A shows an unfolded view of a domain with curved creases on opposite sides. FIG. 16B show an example of aligning these creases on opposite sides of a domain. The respective unit vectors along the bend lines on one side are oriented towards the crease on the opposite side. Such a unit vector is shown in FIG. 16B each curved crease Similarly, for a left and right crease, as an example, there is a known relationship between directions of the bend lines of the left crease to the direction of the bend lines in the right crease: they point towards each other. Thus the method includes determining the average direction of bend lines of both the left crease and the right crease, and adjusting the creases so that the average directions point towards each other. The method further includes assuming that there is constancy of average bend line length to set up the distance between the creases.

The third degree of freedom to align the creases is a rotational degree of freedom. FIG. 16B shows the axis of radiation for such a third degree of freedom as axis AA. The method includes rotating about the axis of the third degree of freedom until the endpoints of the creases are parallel.

Thus one embodiment of a method of aligning the curved creases on opposite sides of each domain method includes starting with a crease positioned in a first position, and aligning the corresponding crease using both direction of the average bend lines, the constancy of average bend line length, and the rotation.

Step 5: Rendering the Panels

Once the 3D model is determined, step 5 includes rendering the panels for viewing in a 3D perspective view. Many rendering methods are known in the art, and the method does not depend on any particular method being used. One embodiment includes triangulating the surfaces, that is, the surface of each panel is broken up into triangular planes using the bend lines. Once the surfaces are in the form of triangles, a view and lighting are selected, and the selected view is rendered for display using a rendering method for surfaces that are made up of planar triangles, e.g., using a lighting model.

Figure 17:
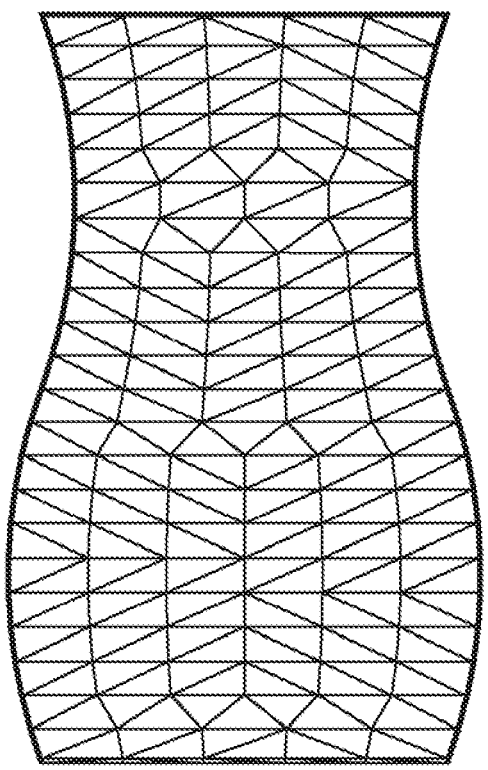
FIG. 17 shows the example domain of a panel of FIG. 16A, divided into triangular regions for rendering.

Consider, for example, the panel of FIG. 16A. FIG. 17 shows the panel of FIG. 16A divided into triangles. The folded 3D model is then easily rendered using a rendering method.

Once a 3D model in triangulated form is available, manipulations shown in 3D are possible, e.g., for viewing different viewpoints of the design, for adding graphics to the panels, for aligning and viewing graphics that are to be on one or more of the panels, and for unfolding the 3D design, e.g., including the graphics.

Example of Use in Designing Graphics

Returning again to the flow chart of FIG. 19, in 1903, carton structural information relating to the physical characteristics of the carton to be fabricated is input. In 1905, the method accepts graphics for each surface or overall panel of the completed carton that is to bear graphics. The graphics may already exist, e.g., in the form of graphic files, or a graphics artist may create the graphics, e.g., on the processing system 2000. Even if the graphics are from an existing file, the graphics may still need to be manipulated so as to be suitable for printing on the final carton. Note that the graphics also may be laced only once the 3D model is known, so as to place the graphics while viewing a 3D rendering.

In 1907 the method uses the carton structural information to create a 2D structural model of the substrate, and to display, e.g., on display system 2021 a two-dimensional image of the unfolded substrate, indicating where the cut lines and scoring or fold lines are located.

In 1909, the method uses the carton structural information to form a 3D model of the carton, using methods described hereinabove, and displays a perspective 3D view, e.g., a shaded surface view of the 3D carton.

By simultaneously providing a 2D unfolded view and a perspective 3D view of the carton, one aspect of the invention facilitates the design task by providing for the user the ability to indicate, e.g., select on the 3D view, an action to be performed on the 2D unfolded view. For example, the action may be to place or move graphics, and this an be carried out while viewing a rendering of the 3D model. The method includes "unfolding" so that such action on the 3D model are reflected in the 2D unfolded view, and can be used to generate 2D date for printing. Furthermore, actions performed on the 2D unfolded view may be viewed on the 3D view by the user, and vice-versa. In the 2D unfolded view or the 3D folded view, the user, e.g., the package designer carries out the design task of superimposing graphics on the panels by positioning the graphics on all the flaps that contribute to this panel using information provided at step 1903. The graphics artist can manipulate, e.g., stretch, shrink, rotate, invert, copy, cut, and paste portions of the graphics over the 2D outline of the substrate, or can manipulate the rendered 3D view until satisfied that properly proportioned graphics cover the panel and flap regions intended to bear printed graphics. The results are viewable on the 3D view and translatable by unfolding on the 2D view.

FIG. 19 shows various tasks that can be performed once the 2D and 3D models are determined. For example, in block 1911, the user selects flaps which are to bear graphics and designs/places the graphics on each such flap. This is typically carried out flap-by-flap. In some embodiments of the invention, the selecting of the flap is done in the 3D view, while the design is done on the 2D unfolded view. The result of the design updates the 3D view.

Referring first to 1913, a common task is selecting a flap on which to design. Recall that a flap may be a component of a panel. One feature of some embodiments of the invention is providing for the user to select a flap in the 3D view. One feature of some embodiments of the invention is that when a user selects a flap in the 3D view, the 2D display is updated to show the selected flap. Another feature of some embodiments of the invention is zooming the 2D unfolded view of the flap to facilitate adding graphics to the flap.

Another feature of some embodiments of the invention, shown as 1915 in FIG. 19, is the providing for the user by the method the ability to interactively and temporarily rotate the planar 2D image of the unfolded carton such that the selected flap's image is shown in the 2D display rotated to be the right way up to facilitate design. Thus, the method includes determining how the planar image of the unfolded substrate needs to be rotated so that the image of the selected flap is shown in the 2D display the right way up in an orientation to facilitate designing the flap. The method further includes rotating the image shown in the 2D display by the determined rotation amount. The rotation is, e.g., by 90, 180, 270 degrees, or by any angle that provides for a desired orientation.

Another aspect of the invention, shown as 1917 in FIG. 19, includes using 3D guides to ensure image continuity over different panels in the 3D image of folded carton.

Thus, in summary, one embodiment includes a computer implemented method including:

accepting the specification of a carton having at least one curved crease, the specification including, for example, the cutting lines and creases in a 2D unfolded representation of the carton;

for a curved crease, accepting a folding angle at any point of the crease;

automatically calculating at least one shape of the folder carton in order to determine a 3D model of the carton; and manipulating the 3D model, e.g., by placing graphics thereon, and calculating the 2D unfolded representation of the carton that results from such manipulations of the 3D model.

The selecting of a fold angle and automatically determining the shape provide the feature of automatically snapping together different parts of a package, and changing the shape of the package to show 3D rendered view of the package.

Different embodiment include computer-readable media on which are encoded instructions that when executed by a processing system, cause the carrying out of the methods described herein. Thus, referring to a particular method, one embodiment of the invention is a computer readable medium having encoded thereon that when executed by a processing system, cause the carrying out of the particular method.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

Note that when a method is described that includes several elements, e.g., several steps, no ordering of such elements, e.g., steps is implied, unless specifically stated.

The methodologies described herein are, in one embodiment, performable by one or more processors that accept computer-readable (also called machine-readable) logic encoded on one or more computer-readable media containing a set of instructions that when executed by one or more of the processors cause carrying out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable medium that is encoded with logic (e.g., software) including a set of instructions to cause performing, when executed by one or more processors, one of more of the methods described herein. The software may reside in the hard disk, or may also reside, completely or at least partially, within the RAM and/or within the processor during execution thereof by the computer system. Thus, the memory and the processor also constitute computer-readable medium on which is encoded logic, e.g., in the form of instructions.

Furthermore, a computer-readable medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable medium on which are encoded a set of instructions, e.g., a computer program that are for execution on one or more processors, e.g., one or more processors that are part of design system for designing packaging, an example of which is shown in FIG. 20. Thus, as will be appreciated by those skilled in the art, embodiments of the present invention may be embodied as a method, an apparatus such as a special purpose apparatus, an apparatus such as a data processing system, or a computer-readable medium, e.g., a computer program product. The computer-readable medium carries logic including a set of instructions that when executed on one or more processors cause the a processor or processors to implement a method. Accordingly, aspects of the present invention may take the form of a method, an entirely hardware embodiment, an entirely software embodiment (embodied in a computer readable storage medium) or an embodiment combining software and hardware aspects. Furthermore, the present invention may take the form of computer-readable medium (e.g., a computer program product provided as a computer-readable storage medium) having encoded thereon computer-readable program code embodied in the medium.

The software may further be transmitted or received over a network via a network interface device. While the computer readable medium is shown in an example embodiment to be a single medium, the term "computer readable medium" should be taken to include a single medium or multiple media (e.g., a centralized or distributed database, and/or associated caches and servers) that store the one or more sets of instructions. The term "computer readable medium" shall also be taken to include any medium that is capable of storing, encoding or carrying a set of instructions for execution by one or more of the processors and that cause the one or more processors to perform any one or more of the methodologies of the present invention. A computer readable medium may take many forms, including but not limited to, non-volatile media, and volatile media. Non-volatile media includes, for example, optical, magnetic disks, and magneto-optical disks. Volatile media includes dynamic memory, such as main memory. For example, the term "computer readable medium" shall accordingly be taken to included, but not be limited to a tangible computer-readable medium, e.g., a solid-state memory, or a computer software product encoded in computer-readable optical or magnetic media.

It will be understood that the steps of methods discussed are performed in one embodiment by an appropriate processor (or processors) of a processing (i.e., computer) system executing instructions stored in storage. It will also be understood that embodiments of the present invention are not limited to any particular implementation or programming technique and that the invention may be implemented using any appropriate techniques for implementing the functionality described herein. Furthermore, embodiments are not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the DESCRIPTION OF EXAMPLE EMBODIMENTS are hereby expressly incorporated into this DESCRIPTION OF EXAMPLE EMBODIMENTS, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulae given above are merely representative of procedures that may be used. Functionality may be added or deleted from the block diagrams and operations may be interchanged among functional blocks. Steps may be added or deleted to methods described within the scope of the present invention.

I claim:

1. A method of operating a processing system that includes at least one processor and a storage subsystem, the method comprising:

accepting in the processing system a specification of a carton made up of a substrate and having at least one curved crease, and storing at least part of the specification in the storage subsystem of the processing system, wherein the specification includes at least cut lines and crease lines of a two-dimensional unfolded model of the carton;

determining or accepting as part of the specification panels of the carton, the determining comprising for a crease that can have a panel on the left and on the right:

starting at a start point along the crease, following a first path in a first direction, the first direction being clockwise or counterclockwise such that at each intersection, a right-hand turn is taken for the first direction being clockwise or a left-hand turn is taken for the first direction being counterclockwise until returning to the start point, such that a path that forms an outline of the panel on a first side of the crease is defined;

starting at the start point along the crease, following a second path in a second direction, the second direction being counterclockwise or clockwise, and opposite the first direction, such that at each intersection, a left-hand turn is taken for the second direction being counterclockwise or a right-hand turn is taken for the second direction being clockwise, until returning to the start point, such that a second path that forms an outline of the panel on a second side of the crease is defined; and uniting any duplicate panels;

dividing each panel into one or more domains so that the substrate of each domain only bends in one direction;

for a curved crease, accepting in the processing system a folding angle at any point of the crease; and automatically calculating by at least one processor of the processing system at least one shape of the folded carton, including reading from the storage subsystem at least some of the stored part of the specification the calculating to determine a three-dimensional model of the folded carton, wherein the carton when unfolded to a flat two-dimensional surface includes at least one cut.

2. A method as recited in claim 1, further comprising:

accepting graphics to cover one or more panels of the carton;

accepting user instructions as to where to place the accepted graphics; and unfolding the three-dimensional model with graphics thereon to determine planar areas suitable for printing on a substrate.

3. A method as recited in claim 1, wherein calculating the shape of a curved crease includes dividing the crease into small straight line segments, with a bend line emanating from each end of each straight line segment, and wherein in the immediate vicinity of each crease, the substrate of the carton is considered to be made up of small planes next to each straight line segment.

4. A method as recited in claim 1, wherein any panel of the carton that has at least one curved crease has a size that is least 25 times the thickness of the substrate.

5. A method of operating a processing system that includes at least one processor, a display device, and a storage subsystem, the method comprising:

accepting in the processing system a specification of a carton made up of a substrate and having at least one curved crease and storing at least part of the specification on the storage subsystem, the specification including at least cut lines and crease lines;

accepting in the processing system specification of panels of the carton or determining panels of the carton, the determining comprising, for a crease that can have a panel on the left and on the right:

starting at a start point along the crease, following a first path in a first direction, the first direction being clockwise or counterclockwise such that at each intersection, a right-hand turn is taken for the first direction being clockwise or a left-hand turn is taken for the first direction being counterclockwise until returning to the start point, such that a path that forms an outline of the panel on a first side of the crease is defined;

starting at the start point along the crease, following a second path in a second direction, the second direction being counterclockwise or clockwise, and opposite the first direction, such that at each intersection, a left-hand turn is taken for the second direction being counterclockwise or a right-hand turn is taken for the second direction being clockwise, until returning to the start point, such that a second path that forms an outline of the panel on a second side of the crease is defined; and uniting any duplicate panels;

determining by at least one processor of the processing system how any curved creases in each panel are connected, including;

automatically calculating, using at least one processor of the processing system, the shape of at least some of the curved creases when folded, the calculating including reading at some of the stored part of the specification;

aligning by at least one processor of the processing system the curved creases on opposite sides of each domain to obtain a three-dimensional model of the folded carton;

rendering the carton in a selected view; and displaying the rendered carton's selected view on the display device.

6. A method as recited in claim 5, wherein the calculating of the shape includes for a curved crease, accepting a folding angle at any point of the crease; and automatically calculating the shape of the crease when folded.

7. A method as recited in claim 5, wherein each domain has at most two curved creases.

8. A method as recited in claim 5, wherein dividing a particular panel into domains includes:
  selecting a direction for traversal;
  traversing the outline of the particular panel in the selected direction, including listing the creases on the outline of the panel arranged according to the selected order of traversal, including dividing each curved crease into two halve curves.

9. A method as recited in claim 8, wherein any gluing of panels is taken into account such that when one panel is glued to another panel resulting in a combined panel of the carton, the creases from both panels are taken into account when determining the domains of the combined panel.

10. A method as recited in claim 8, wherein dividing a particular panel into domains includes partitioning the half-curves of a particular curved crease into sets, each having two half-creases, where half-curves in a set never join half-curves in any other set, the sets forming the contours of the domains.

11. A method as recited in claim 5, wherein calculating the shape of a curved crease includes dividing the crease into small straight line segments, with a bend line emanating from each end of each straight line segment, and wherein in the immediate vicinity of each crease, the substrate of the carton is considered to be made up of small planes next to each straight line segment.

12. A method as recited in claim 11, wherein any panel of the carton that has at least one curved crease has a size that is least 25 times the thickness of the substrate.

13. A method as recited in claim 11, wherein any panels of the carton that has at least one curved crease has a size that is least 25 times the thickness of the substrate.

14. A method as recited in claim 11, wherein the calculating of the shape includes
  for a curved crease, accepting a folding angle at any point of the crease; and
  automatically calculating the shape of the crease when folded.

15. A method as recited in claim 14, wherein at an end point on a straight line segment of a curved fold line where there are four small planar regions meeting, denoting the angles of the fold lines in an unfolded view as a, b, c, and d, and the accepted fold angle by A, denoting by u1, u2, and u4 respective unit vectors from the end point along three of the fold lines, the remaining solid angles of the planar regions, denoted by B, C, and D are determined by:

$C = \arccos((\cos sub - \cos(c)\cos(d))/\sin(c)\sin c(d))$, $B = \pm c1 \pm b1$, $D = \pm c3 \pm b3$, wherein:
cos sub is the cosine of the angle between u2, and u4,
sin sub is the sine of the angle between u2, and u4, $\cos sub = \cos(a)\cos(b) + \sin(a)\sin(b)\cos(A)$, $\sin sub = \sqrt{1 - \cos sub * \cos sub}$, $b1 = \arccos((\cos(d) - \cos sub \cdot \cos(c))/\sin sub \cdot \sin(c))$, $b3 = \arccos((\cos(c) - \cos sub \cdot \cos(d))/\sin sub \cdot \sin(d))$, $n1 = u2 \wedge u1 / |u2 \wedge u1|$, $n2 = u2 \wedge u4 / |u2 \wedge u4|$, $n3 = u1 \wedge u4 / |u1 \wedge u4|$, with $\wedge$ denoting the three-dimensional cross product and $|\cdot|$ denoting the length of a vector,
c1 and c3 are the angles between normals n1 and n2, and n2 and n3, respectively, $c1 = \arccos(n1 \cdot n2)$, $c3 = \arccos(n2 \cdot n3)$, with "·" denoting the dot product, wherein in applying the formulae $B = \pm c1 \pm b1$ and $D = \pm c3 \pm b3$, the solutions that provide angles close to 180 degrees are selected to resolve any ambiguity regarding whether each "±" is "+" or "−",
such that the angle C for the four planar regions meeting at the end point becomes the angle C for the other end point of the straight line segment, and
wherein automatically calculating the shape of the crease includes repeating applying the formulae for successive straight line segments of the curved crease.

16. A method as recited in claim 5, further comprising dividing the surface of each panel into triangular planes, such that the rendering is of triangular planar sections.

17. A method as recited in claim 5, further comprising:
  accepting graphics to cover one or more panels of the carton, and accepting user instructions as to where to place the accepted graphics; and
  unfolding the three-dimensional model with graphics thereon to determine planar areas suitable for printing on a substrate.

18. A non-transitory computer readable storage medium having instructions encoded thereon that when executed by one or more processors of a processing system that includes at least one processor and a storage subsystem, cause execution of a method comprising:
  accepting a specification of a carton made up of a substrate and having at least one curved crease, and storing at least part of the specification in the storage subsystem of the processing system, wherein the specification includes at least cut lines and crease lines of a two-dimensional unfolded model of the carton;
  determining or accepting as part of the specification panels of the carton, the determining comprising for a crease that can have a panel on the left and on the right:
    starting at a start point along the crease, following a first path in a first direction, the first direction being clockwise or counterclockwise such that at each intersection, a right-hand turn is taken for the first direction being clockwise or a left-hand turn is taken for the first direction being counterclockwise until returning to the start point, such that a path that forms an outline of the panel on a first side of the crease is defined;
    starting at the start point along the crease, following a second path in a second direction, the second direction being counterclockwise or clockwise, and opposite the first direction, such that at each intersection, a left-hand turn is taken for the second direction being counterclockwise or a right-hand turn is taken for the second direction being clockwise, until returning to the start point, such that a second path that forms an outline of the panel on a second side of the crease is defined; and
    uniting any duplicate panels;
  dividing each panel into one or more domains so that the substrate of each domain only bends in one direction;
  for a curved crease, accepting a folding angle at any point of the crease; and
  automatically calculating on the processor at least one shape of the folded carton, including reading from the storage subsystem at least part of the stored part of the specification the calculating to determine a three-dimensional model of the folded carton.

19. A non-transitory computer readable storage medium as recited in claim 18, wherein the method further comprises:
- accepting graphics to cover one or more panels of the carton, and accepting user instructions as to where to place the accepted graphics; and
- unfolding the three-dimensional model with graphics thereon to determine planar areas suitable for printing on a substrate.

20. A non-transitory computer readable storage medium having instructions encoded thereon that when executed by one or more processors of a processing system that includes at least one processor, a display device, and a storage subsystem, cause execution of a method comprising:
- accepting a specification of a carton made up of a substrate and having at least one curved crease and storing at least part of the specification on the storage subsystem, the specification including at least cut lines and crease lines;
- accepting specification of panels of the carton or determining panels of the carton, the determining comprising, for a crease that can have a panel on the left and on the right:
  - starting at a start point along the crease, following a first path in a first direction, the first direction being clockwise or counterclockwise such that at each intersection, a right-hand turn is taken for the first direction being clockwise or a left-hand turn is taken for the first direction being counterclockwise until returning to the start point, such that a path that forms an outline of the panel on a first side of the crease is defined;
  - starting at the start point along the crease, following a second path in a second direction, the second direction being counterclockwise or clockwise, and opposite the first direction, such that at each intersection, a left-hand turn is taken for the second direction being counterclockwise or a right-hand turn is taken for the second direction being clockwise, until returning to the start point, such that a second path that forms an outline of the panel on a second side of the crease is defined; and
  - uniting any duplicate panels;
- determining how any curved creases in each panel are connected, including;
- automatically calculating, using the processor, the shape of at least some of the curved creases when folded, including reading at least part of the stored part of the specification;
- aligning the curved creases on opposite sides of each domain to obtain a three-dimensional model of the folded carton;
- and rendering the carton in a selected view; and
- displaying the rendered carton's selected view on the display device.

21. A non-transitory computer readable storage medium as recited in claim 20, wherein the method further comprises:
- accepting graphics to cover one or more panels of the carton; and
- accepting user instructions as to where to place the accepted graphics; and
- unfolding the three-dimensional model with graphics thereon to determine planar areas suitable for printing on a substrate.

22. A non-transitory computer readable storage medium as recited in claim 20, wherein the calculating of the shape includes for a curved crease, accepting a folding angle at any point of the crease; and automatically calculating the shape of the crease when folded.

23. A non-transitory computer readable storage medium as recited in claim 20, wherein each domain has at most two curved creases.

24. A non-transitory computer-readable storage medium as recited in claim 20, wherein dividing a particular panel into domains includes:
- selecting a direction for traversal;
- traversing the outline of the particular panel in the selected direction, including listing the creases on the outline of the panel arranged according to the selected order of traversal, including dividing each curved crease into two halve curves.

25. A non-transitory computer readable storage medium as recited in claim 20, wherein dividing a particular panel of a particular curved crease into domains includes partitioning the half-curves of the particular curved crease into sets, each having two half-creases, where half-curves in a set never join half-curves in any other set, the sets forming the contours of the domains.

26. A non-transitory computer readable storage medium as recited in claim 20, wherein calculating the shape of a curved crease includes dividing the crease into small straight line segments, with a bend line emanating from each end of each straight line segment, and wherein in the immediate vicinity of each crease, the substrate of the carton is considered to be made up of small planes next to each straight line segment.

* * * * *